(12) United States Patent
Okura

(10) Patent No.: US 11,271,768 B2
(45) Date of Patent: Mar. 8, 2022

(54) DISASTER-PREVENTION-INFORMATION-ASSOCIATED CONTROL DEVICE, DISASTER-PREVENTION-INFORMATION-ASSOCIATED CONTROL SYSTEM, AND DISASTER-PREVENTION-INFORMATION-ASSOCIATED CONTROL METHOD

(71) Applicant: SHARP KABUSHIKI KAISHA, Sakai (JP)

(72) Inventor: Ataru Okura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 56 days.

(21) Appl. No.: 16/473,925

(22) PCT Filed: Dec. 22, 2017

(86) PCT No.: PCT/JP2017/046118
§ 371 (c)(1),
(2) Date: Jun. 26, 2019

(87) PCT Pub. No.: WO2018/123861
PCT Pub. Date: Jul. 5, 2018

(65) Prior Publication Data
US 2019/0349215 A1  Nov. 14, 2019

(30) Foreign Application Priority Data
Dec. 27, 2016 (JP) .............................. JP2016-253884

(51) Int. Cl.
*G05B 19/042* (2006.01)
*H04L 12/28* (2006.01)

(52) U.S. Cl.
CPC ...... *H04L 12/2816* (2013.01); *G05B 19/0428* (2013.01); *H04L 2012/285* (2013.01)

(58) Field of Classification Search
CPC .......... H04L 12/2816; H04L 2012/285; G05B 19/0428; G05B 19/042; G08B 21/10; G08B 23/00; G08B 25/04
See application file for complete search history.

(56) References Cited

U.S. PATENT DOCUMENTS 6,130,412 A * 10/2000 Sizemore ............... F24C 7/08
219/414
2007/0013532 A1* 1/2007 Ehlers .................. G08B 27/008
340/584
(Continued)

FOREIGN PATENT DOCUMENTS

JP 2013-009488 A 1/2013
JP 2014-220975 A 11/2014
(Continued)

*Primary Examiner* — Mark A Connolly
(74) *Attorney, Agent, or Firm* — ScienBiziP, P.C.

(57) ABSTRACT

The possibility of an undesirable situation happening to a user is reduced in controlling an operation of an electrical appliance in accordance with issued disaster prevention information. An electrical appliance (3) is at least assigned a primary and a secondary operation of a two-stage operation as a disaster-prevention-information-associated operation. A disaster-prevention-information-associated control device (2) instructs the electrical appliance (3) to perform the primary operation in response to a detection of an issuance of disaster prevention information and instructs the electrical appliance (3) to perform the secondary operation after a prescribed period of time has elapsed.

21 Claims, 10 Drawing Sheets

| Designated Disaster Prevention Information | Electrical Appliance | Primary Operation | Secondary Operation |
|---|---|---|---|
| Heavy Rain Warning<br>Storm Warning<br>Special Warning<br>Lightning Advisory | Storage Battery | Stop Charging | Charge |
| Heavy Rain Warning<br>Storm Warning<br>Special Warning<br>Lightning Advisory | Water Heater | Stop Dispensing Hot Water | Boil Up |
| Heavy Rain Warning<br>Storm Warning<br>Special Warning | Air Conditioner | Cooling at 25°C | Cooling at 28°C |
| Lightning Advisory<br>Special Warning | Power Tap | Turn On Power Supply | Turn Off Power Supply |
| Heavy Rain Warning<br>Storm Warning<br>Special Warning | Refrigerator | — | Energy Saving Mode |
| Heavy Rain Warning<br>Storm Warning<br>Special Warning<br>Heavy Rain Advisory<br>Gale Advisory<br>Lightning Advisory | User Interface Device | Alert Operation | — |

(56) References Cited

U.S. PATENT DOCUMENTS

| | | | |
|---|---|---|---|
| 2015/0350404 A1* | 12/2015 | Wakameda | H04W 4/90 |
| | | | 455/404.2 |
| 2015/0364027 A1* | 12/2015 | Haupt | G01W 1/10 |
| | | | 340/521 |
| 2016/0114694 A1 | 4/2016 | Satomi et al. | |
| 2016/0134113 A1* | 5/2016 | Dushane | H05B 47/11 |
| | | | 700/295 |

FOREIGN PATENT DOCUMENTS

| | | |
|---|---|---|
| JP | 2015-226275 A | 12/2015 |
| JP | 2016-039590 A | 3/2016 |
| JP | 2016-220381 A | 12/2016 |

* cited by examiner

FIG. 3

| Designated Disaster Prevention Information | Electrical Appliance | Primary Operation | Secondary Operation |
|---|---|---|---|
| Heavy Rain Warning<br>Storm Warning<br>Special Warning<br>Lightning Advisory | Storage Battery | Stop Charging | Charge |
| Heavy Rain Warning<br>Storm Warning<br>Special Warning<br>Lightning Advisory | Water Heater | Stop Dispensing Hot Water | Boil Up |
| Heavy Rain Warning<br>Storm Warning<br>Special Warning | Air Conditioner | Cooling at 25°C | Cooling at 28°C |
| Lightning Advisory<br>Special Warning | Power Tap | Turn On Power Supply | Turn Off Power Supply |
| Heavy Rain Warning<br>Storm Warning<br>Special Warning | Refrigerator | — | Energy Saving Mode |
| Heavy Rain Warning<br>Storm Warning<br>Special Warning<br>Heavy Rain Advisory<br>Gale Advisory<br>Lightning Advisory | User Interface Device | Alert Operation | — |

FIG. 10

| Settings for associated operations performed by electrical appliances upon issuance of designated disaster prevention information |||
|---|---|---|
| Associated electrical appliance: | Air conditioner 1 ▼ ||
| Primary operation: | Cooling ▼   25.0°C ▼ | Notification off ▼ |
| Secondary operation: | Cooling ▼   28.0°C ▼ ||
| Associated electrical appliance: | Refrigerator 1 ▼ ||
| Primary operation: | Not applicable ▼ | Notification on ▼ |
| Secondary operation: | Energy saving mode ▼ ||
| Associated electrical appliance: | ▼ ||

DISASTER-PREVENTION-INFORMATION-ASSOCIATED CONTROL DEVICE, DISASTER-PREVENTION-INFORMATION-ASSOCIATED CONTROL SYSTEM, AND DISASTER-PREVENTION-INFORMATION-ASSOCIATED CONTROL METHOD

TECHNICAL FIELD

The present invention relates to technology to control operations of electrical appliances in accordance with disaster prevention information.

BACKGROUND ART

Technology is known that controls the charging/discharging of an electric power consumer's storage battery in response to the issuance of information or a warning related to disaster prevention from the Meteorological Agency or a like public organization.

Patent Literature 1 listed below discloses an electric power restoration system that starts charging a vehicle-use storage battery immediately upon a reception means receiving disaster information issued by, for example, the Meteorological Agency so as to ensure that the vehicle-use storage battery can be used as an electric power source in the wake of a disaster. This electric power restoration system also controls switching from an initial electric power source (e.g., grid power) to another electric power source (e.g., storage battery) in response to the reception of the disaster information by the reception means.

Patent Literature 2 listed below discloses a storage battery managing device that specifies a ratio for distributing stored electric power in such a manner that more-than-usual electric energy becomes available for a certain purpose (e.g., power supply in a power failure) and another purpose (e.g., powering an electric vehicle) in a geographical region for which a warning has been issued that is related to the prevention of disaster (e.g. for a typhoon, tornado, lightning, or heavy snow fall) from the moment the warning is issued till the lifting of the warning.

CITATION LIST

Patent Literature

Patent Literature 1: Japanese Unexamined Patent Application Publication, Tokukai, No. 2013-9488 (Publication Date: Jan. 10, 2013)
Patent Literature 2: Japanese Unexamined Patent Application Publication, Tokukai, No. 2014-220975 (Publication Date: Nov. 20, 2014)

SUMMARY OF INVENTION

Technical Problem

The conventional art described above starts controlling as to the charging/discharging of a storage battery as soon as information or a warning is issued in relation to the prevention of disaster, which may create an undesirable, problematic situation for the user.

For instance, upon the reception means receiving disaster information, the electric power source may be switched against the will of the user from a power grid to a storage battery, which would lead to a situation that is undesirable to the user. Such an undesirable situation to the user may occur, as an example, when an electronic device such as a personal computer is temporarily cut off from its power supply during operation. Some electronic devices will require restoration work after the electric power source is switched. Meanwhile, if the storage battery is used as an emergency power source and discharges in response to a late-at-night announcement of disaster information, economic benefits will be lost. That can be another such example of an undesirable situation to users if they prefer to charge the storage battery on night time power at cheap unit price.

An undesirable situation to the user may also occur, as another example, if the system starts charging a vehicle-use storage battery immediately upon a reception of disaster information when there is actually a low risk of disaster. The user may not want to go as far as purchasing electric power to charge the vehicle-use storage battery.

The present invention, in an aspect thereof, has an object to achieve disaster-prevention-information-associated control that reduces the possibility of an undesirable situation happening to the user in controlling the operation of an electrical appliance in accordance with issued disaster prevention information.

Solution to Problem

To address these problems, the present invention, in an aspect thereof, is directed to a disaster-prevention-information-associated control device: storing a primary operation of a two-stage operation assigned to a first electrical appliance and a secondary operation of the two-stage operation assigned to a second electrical appliance as disaster-prevention-information-associated operation associated with disaster prevention information; giving the first electrical appliance an instruction as to the primary operation in response to a detection of an issuance of disaster prevention information in response to which the disaster-prevention-information-associated control device should perform disaster-prevention-information-associated control; and giving the second electrical appliance an instruction as to the secondary operation after a prescribed period of time has elapsed.

To address the problems, the present invention, in another aspect thereof, is directed to a disaster-prevention-information-associated control method performed by a disaster-prevention-information-associated control device, the method including: assigning a first electrical appliance a primary operation of a two-stage operation and a second electrical appliance secondary operation of the two-stage operation as a disaster-prevention-information-associated operation associated with disaster prevention information; giving the first electrical appliance an instruction as to the primary operation in response to a detection of an issuance of disaster prevention information in response to which the disaster-prevention-information-associated control device should perform disaster-prevention-information-associated control; and giving the second electrical appliance an instruction as to the secondary operation after a prescribed period of time has elapsed.

Advantageous Effects of Invention

The present invention, in an aspect thereof, carries out a disaster-prevention-information-associated operation in two stages in response to an announcement of disaster prevention information. The feature results in the advantage of being able to reduce the possibility of an undesirable situation happening to the user.

BRIEF DESCRIPTION OF DRAWINGS

FIG. 3 is an example of a table stored in a memory included in the disaster-prevention-information-associated control device, showing specific association of designated disaster prevention information, electrical appliances, primary operations, and secondary operations.

FIG. 10 is an illustration of an example input screen displayed by a user interface device in accordance with Embodiment 6 of the present invention to allow the user to associate select electrical appliances with primary and secondary operations.

DESCRIPTION OF EMBODIMENTS

Embodiment 1

Figure 1:
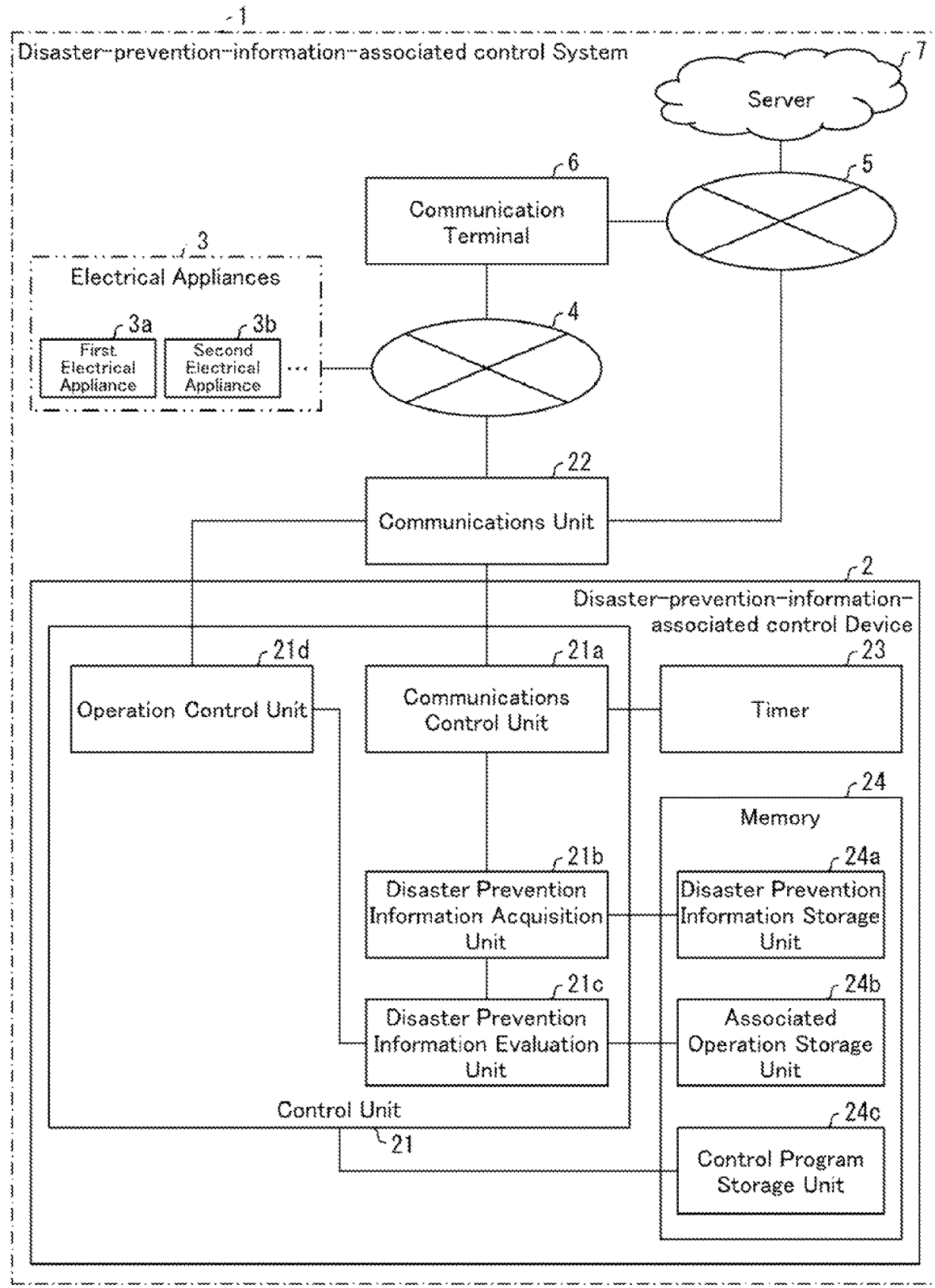
FIG. 1 is a block diagram of a configuration of major components of a disaster-prevention-information-associated control system and a disaster-prevention-information-associated control device in accordance with Embodiment 1 of the present invention.
Figure 2:
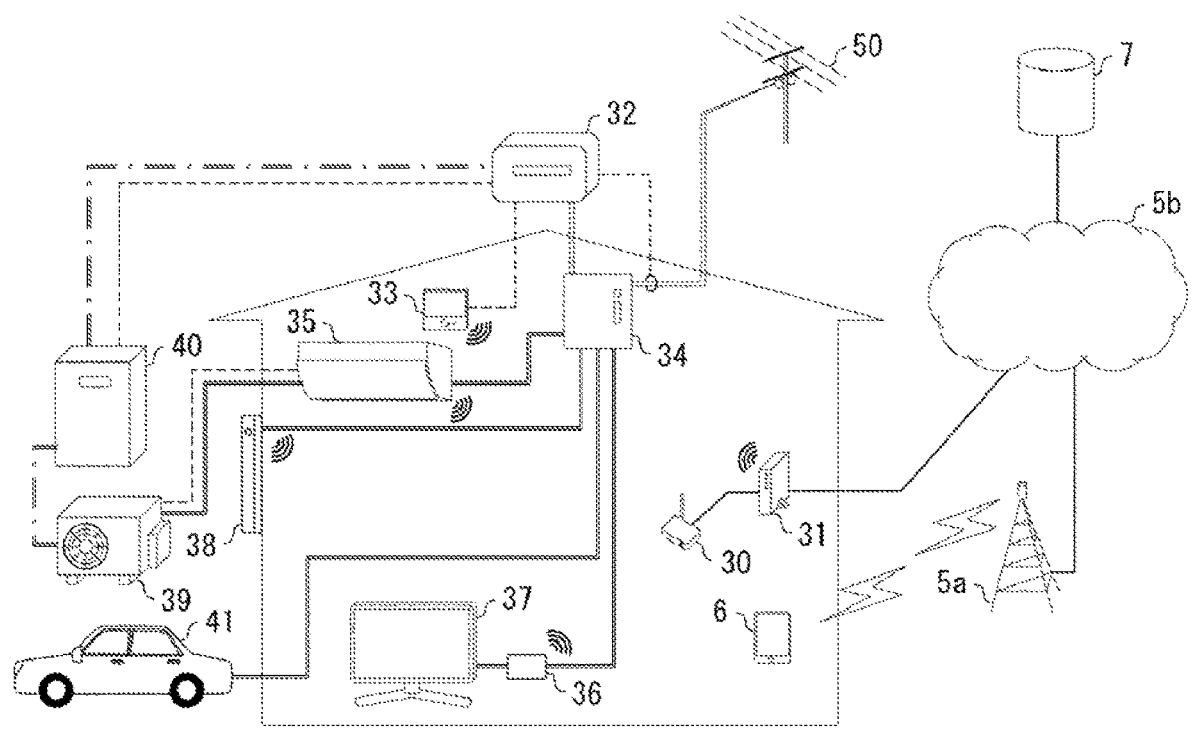
FIG. 2 is an illustration of a specific example of the application of the disaster-prevention-information-associated control system in a typical household.

The following will describe in detail an embodiment of the present invention in reference to FIGS. 1 to 4.
Configuration of Disaster-Prevention-Information-Associated Control System FIG. 1 is a block diagram of a configuration of major components of a disaster-prevention-information-associated control system 1 and a disaster-prevention-information-associated control device 2 in accordance with Embodiment 1 of the present invention. FIG. 2 is an illustration of a specific example of the application of the disaster-prevention-information-associated control system 1 in a typical household. FIG. 3 is an example of a table stored in a memory included in the disaster-prevention-information-associated control device 2, showing specific association of designated disaster prevention information, electrical appliances 3, primary operations, and secondary operations.

Referring to FIG. 1, the disaster-prevention-information-associated control system 1 includes the disaster-prevention-information-associated control device 2 (a controller such as an HEMS controller, which will be described later in detail), at least one electrical appliance 3, a communication terminal 6 as a user interface device, a server 7 (HEMS server), and a communications unit 22. The disaster-prevention-information-associated control device 2 is connected to the electrical appliance 3 and the communication terminal 6 via the communications unit 22 and over a local area network 4 in a communicable manner. The disaster-prevention-information-associated control device 2 is also connected to the server 7 via the communications unit 22 and over a network 5 in a communicable manner. The communications unit 22 is a communication interface (e.g., router) that handles communications over the local area network 4 and the network 5. The communication terminal 6 communicates with the disaster-prevention-information-associated control device 2 and the server 7 and gives a user at least the information received from the server 7 and the information related to the disaster-prevention-information-associated control carried out by the disaster-prevention-information-associated control system 1. The communication terminal 6 also forwards user instructions (including value settings) to the disaster-prevention-information-associated control device 2 either directly or via the server 7. The server 7 manages at least disaster prevention information (detailed later) and the information that the communication terminal 6 gives to the user in relation to the disaster-prevention-information-associated control (e.g., information needed to generate a screen for display).

Configuration of Major Components of Disaster-Prevention-Information-Associated Control Device and Outline of Disaster-Prevention-Information-Associated Control Method A disaster-prevention-information-associated operation is assigned to a first electrical appliance 3a that is an electrical appliance 3 (e.g., a water heater 38 shown in FIG. 2) or a second electrical appliance 3b that is another electrical appliance 3 (e.g., a storage battery 40 shown in FIG. 2) in association with disaster prevention information. The first electrical appliance 3a and the second electrical appliance 3b are different electrical appliances. The disaster-prevention-information-associated operation includes a primary operation and a secondary operation as a two-stage operation. The primary operation is assigned to either one or both of the first electrical appliance 3a and the second electrical appliance 3b, and the secondary operation is assigned to either one or both of the first electrical appliance 3a and the second electrical appliance 3b. The first electrical appliance 3a and the second electrical appliance 3b may be collectively referred to as the electrical appliances 3 without distinguishing between them in the following description. In response to detection of an issuance of disaster prevention information that indicates a necessity of performing the disaster-prevention-information-associated control (designated disaster prevention information), the disaster-prevention-information-associated control device 2 instructs the first electrical appliance 3a or the second electrical appliance 3b to perform the primary operation. After a prescribed period of time has elapsed since a reference time, the disaster-prevention-information-associated control device 2 instructs the same electrical appliance 3 as the one it instructed previously to perform the primary operation to perform the secondary operation or instructs the other electrical appliance 3 to perform the secondary operation.

In an example case where the electrical appliance 3 is the water heater 38 and a storm warning has been issued as designated disaster prevention information, the water heater 38 is filled up with hot water so that it can provide a sufficient amount of hot water available for use. The disaster-prevention-information-associated control device 2, in this case, prohibits supply of hot water to restrict decrease of hot water as a first stage, instead of filling up the water heater 38 with hot water immediately in response to the issuance of a storm warning. Then, after a prescribed period of time has elapsed since a reference time, the disaster-prevention-information-associated control device 2 controls the water heater 38 to be filled up with hot water (allows the water heater 38 to boil up water therein) as a second stage. In this example case, the primary operation prohibits supply of hot water from the water heater 38, and the secondary operation allows the water heater 38 to boil up water therein.

Dividing the disaster-prevention-information-associated operation into two stages in this manner gives a time window to the user of the electrical appliance 3 before the secondary operation is started. The user can accordingly prepare for the start of the secondary operation or see if the electrical appliance 3 needs to perform the secondary operation. The disaster-prevention-information-associated operation can thus reduce the possibility of an undesirable situation happening to the user.

In this example case where the water heater 38 is an example of the electrical appliance 3, both an instruction for the primary operation and an instruction for the secondary operation are given to the water heater 38. Alternatively, an instruction for the primary operation and an instruction for the secondary operation may be given to different electrical appliances 3. A specific example of this alternative case will be described later in detail.

Detailed Description of Configuration of Disaster-Prevention-Information-Associated Control Device A detailed description is now given of an example configuration of the disaster-prevention-information-associated control device 2 that realizes the disaster-prevention-information-associated control method.

The disaster-prevention-information-associated control device 2 includes a control unit 21, a timer 23, and a memory 24 to carry out disaster-prevention-information-associated control in accordance with the disaster prevention information acquired from the server 7.

The timer 23, for example, measures a time interval for the disaster-prevention-information-associated control device 2 to access the server 7 for disaster prevention information as the prescribed period of time from a reference time.

The memory 24 includes a disaster prevention information storage unit 24*a*, an associated operation storage unit 24*b*, and a control program storage unit 24*c* as storage areas. The disaster prevention information storage unit 24*a* contains designated disaster prevention information that is disaster prevention information indicating a necessity of performing disaster-prevention-information-associated control. The designated disaster prevention information may be selected from various disaster prevention information, given as a default (predetermined), or specified by the user via a user interface device such as the communication terminal 6 or an electric power monitor 33 (detailed later). The associated operation storage unit 24*b* contains associated control information on the specific association of the designated disaster prevention information, electrical appliances, and disaster-prevention-information-associated operations, which will be described later in detail with reference to FIG. 3. The control program storage unit 24*c* contains at least control programs executed by the disaster-prevention-information-associated control device 2 to carry out the disaster-prevention-information-associated control.

Configuration of Control Unit

The control unit 21 includes a communication control unit 21*a*, a disaster prevention information acquisition unit 21*b*, a disaster prevention information evaluation unit 21*c*, and an operation control unit 21*d*. As a disaster-prevention-information-associated control operation is started, the disaster prevention information acquisition unit 21*b* instructs the communication control unit 21*a* to acquire disaster prevention information and instructs the timer 23 to start time measurement. The communication control unit 21*a*, in response to the instruction from the disaster prevention information acquisition unit 21*b*, accesses the server 7 via the communications unit 22 and over the network 5 to enquire whether or not disaster prevention information has been issued (enquiry process A). Alternatively, the communication control unit 21*a* acquires, as is, the information that the server 7 acquires regularly from a server of the Meteorological Agency or from another server that transmits information related to disaster prevention (acquisition process B).

The disaster prevention information dealt with in enquiry process A has somewhat limited content and includes, for example: advisories, warnings, and special warnings that fall in the category of weather information; information related to seismic or volcanic activities; and information related to ocean waves. In contrast, the information dealt with in acquisition process B includes a broader range of information than the disaster prevention information dealt with in enquiry process A, such as general weather forecast and weather information for foreign countries, as well as the disaster prevention information dealt with in enquiry process A. The disaster prevention information in response to which disaster-prevention-information-associated control may be performed is limited to a few types of information as listed in FIG. 3 as designated disaster prevention information. Since the designated disaster prevention information is contained in the disaster prevention information storage unit 24*a*, the disaster prevention information acquisition unit 21*b* may instruct the communication control unit 21*a* to send an enquiry to the server 7 to find out whether or not any of the designated disaster prevention information retrieved from the disaster prevention information storage unit 24*a* has been announced (issued). Alternatively, the disaster prevention information acquisition unit 21*b* may determine whether or not the information acquired from the server 7 contains any of the designated disaster prevention information contained in the disaster prevention information storage unit 24*a* (determination process).

The communication control unit 21*a* is provided particularly for the purpose of the communication control unit 21*a* performing processes related to enquiry process A or acquisition process B every time the communication control unit 21*a* is notified by the timer 23 that a prescribed period of time has elapsed.

The disaster prevention information evaluation unit 21*c* may take over the disaster prevention information acquisition unit 21*b* in performing the determination process. When the disaster prevention information evaluation unit 21*c* acquires from the disaster prevention information acquisition unit 21b a determination that designated disaster prevention information is being issued or reaches the same determination by performing the determination process on its own, the disaster prevention information evaluation unit 21c refers to the associated control information contained in the associated operation storage unit 24b. The disaster prevention information evaluation unit 21c then identifies the electrical appliance 3 associated with the designated disaster prevention formation being issued and also identifies the primary and secondary operations that the identified electrical appliance 3 is set to perform. Thereafter, the disaster prevention information evaluation unit 21c instructs the operation control unit 21d to control the identified electrical appliance 3 to sequentially perform the identified primary and secondary operations.

In response to the instruction from the disaster prevention information evaluation unit 21c, the operation control unit 21d instructs the identified electrical appliance 3 via the communications unit 22 and over the local area network 4 to perform the identified primary operation and after a prescribed period of time has elapsed, to perform the identified secondary operation.

Electrical Appliance

The electrical appliance 3 is at least one electrical appliance and may include a plurality of electrical appliances including the electrical appliances 3a, 3b. Examples of the electrical appliance 3 include an air-conditioner indoor unit 35 and an air-conditioner outdoor unit 39, a power tap 36, a television 37, an electric vehicle 41, and other like electrical appliances capable of at least a two-stage operation, as well as the water heater 38 and the storage battery 40 described above, as listed in FIG. 2. Specific examples of the two-stage operation will be described later in detail. Note that the capability of performing at least a two-stage operation is not an essential requirement for the electrical appliance 3. An electrical appliance that can only perform a single-stage operation may be chosen as the electrical appliance 3. For example, a primary operation and a secondary operation may be assigned to a plurality of electrical appliances each capable only of a single-stage operation.

Home Energy Management System

FIG. 2 shows an example of a home energy management system (HEMS) configured so as to be capable of performing disaster-prevention-information-associated control in a typical household. FIG. 2 shows an example where an HEMS controller 30 serves as the disaster-prevention-information-associated control device 2. Alternatively, a power conditioner 32 or the electric power monitor 33 may serve as the disaster-prevention-information-associated control device 2.

The HEMS is an equivalent of the disaster-prevention-information-associated control system 1 shown in FIG. 1 and includes a router 31, the communication terminal 6, and the server 7 (HEMS server), as well as the HEMS controller 30, the various electrical appliances 3 described above, the power conditioner 32, and the electric power monitor 33. There is provided a power distribution board 34 connected to a power system grid 50. The router 31 is an equivalent of the communications unit 22 and connected to the server 7 over the Internet 5b in a communicable manner. The communication terminal 6 is connected to the server 7 over a public telephone network 5a and the Internet 5b in a communicable manner. The main electric power sources used in the typical household shown in FIG. 2 are the AC power purchased from an electric power company via the power system grid 50 and the DC power discharged from the storage battery 40. There may additionally be provided a solar power generation device to generate electric power for use in the household.

The air-conditioner indoor unit 35 operates on the AC power supplied via the power distribution board 34. The air-conditioner outdoor unit 39 operates on the DC power of the storage battery 40 and also on the DC power converted from the AC power of the power system grid 50. The air-conditioner indoor unit 35 has a function of communicating over a wireless LAN and is capable of communicating with the HEMS controller 30 via the router 31 which has a wireless LAN function.

The storage battery 40 stores, via the power conditioner 32, at least any of the electric power generated by a solar power generation device, if any, and the electric power purchased from the electric power company via the power system grid 50.

The power conditioner 32 is connected to the storage battery 40 and the power distribution board 34 to manage electric power usage. Specifically, the power conditioner 32 manages the flow of electric power to and from the power distribution board 34. In the present embodiment, the power conditioner 32 acquires information on the AC power sold via the power system grid 50 to the electric power company and also acquires information on the AC power purchased via the power system grid 50 from the electric power company.

The power conditioner 32 also has a function of storing in the storage battery 40 the DC power converted from the AC power purchased via the power system grid 50 and a function of converting the DC power stored in the storage battery 40 to AC power for supply to loads including the electrical appliance 3. The power conditioner 32 has additional functions including a function of selling electric power to the electric power company via the power system grid 50 by exporting the electric power generated by a solar power generation device, if any, to the power system grid 50.

The electric power monitor 33 has, for example, a function of performing communications with a display unit, a user operation receiving unit, and the power conditioner 32 so that the user can check the information acquired by the power conditioner 32 on the electric power monitor 33. The electric power monitor 33, serving as a user interface device, is also capable of receiving inputs from the user so that the user can control the operation of, for example, the power conditioner 32. The electric power monitor 33 has a function of communicating over a wireless LAN and is capable of operating in concert with the HEMS controller 30 and the electrical appliance 3 through control instructions that are in compliance with ECHONET Lite®. The user may be notified of various information related to the disaster-prevention-information-associated control, for example, by text, image, and/or sound outputs from the electric power monitor 33 or from the communication terminal 6.

The HEMS controller 30 may transmit ECHONET Lite-compliant control instructions via the router 31 to the electrical appliance(s) 3 to be controlled (the air-conditioner indoor unit 35, the power tap 36, and the water heater 38 in the present embodiment). The HEMS controller 30 may transmit control instructions when the HEMS controller 30 has determined to do so or may alternatively relay the control instructions transmitted from the server 7. The HEMS controller 30 and the electrical appliance 3 do not necessarily transmit and receive ECHONET Lite-compliant control instructions and may alternatively transmit and receive control instructions that are in compliance with any communication standard agreed upon by both the HEMS controller 30 and the electrical appliance 3.

The router 31 is a common router and has a function of providing connection to the Internet 5b. The router 31 also has an IEEE 802.11 wireless local area network (LAN) function and communicates with the electrical appliance 3 such as the air-conditioner indoor unit 35 over a wireless LAN. Meanwhile, the router 31 is connected to the HEMS controller 30 via an Ethernet® cable.

The communication terminal 6 is typically a smartphone. Applications and other programs for remote control of the electrical appliance 3 and for browsing through the information related to electric power measurements may be executed on the server 7 in such a manner that the applications can be accessed and used via a general Web browser on the communication terminal 6. Alternatively, for example, the applications may be installed directly in the communication terminal 6 to run on the communication terminal 6. The user can utilize a remote monitoring system upon entering a user ID and a password given to the user on the communication terminal 6. Because the communication terminal 6 and the server 7 communicate with each other over the public telephone network 5a and the Internet 5b, the user can send instructions to the HEMS controller 30, for example, even when he/she is out of home. When the user is at home, the communication terminal 6 may communicate with the server 7 via the router 31 over a wireless LAN.

The server 7 includes an interface for communications with the HEMS controller 30 and has a function of, upon receiving from the communication terminal 6 control instructions destined for an electrical appliance to be controlled, transmitting these control instructions to the HEMS controller 30. The server 7 has another interface for communications with the communication terminal 6 to respond to the communication terminal 6 upon request from the communication terminal 6.

Designated Disaster Prevention Information

Next, referring to FIG. 3, a specific description will be given next of the associated control information contained in the associated operation storage unit 24b.

As shown in FIG. 3, some disaster prevention information that can give a negative impact on the user's home life and/or that may threat the user's safety is chosen and designated as designated disaster prevention information which may trigger disaster-prevention-information-associated control. Typical examples of such designated disaster prevention information include weather warnings such as heavy rain warnings, storm warnings, and special warnings. Weather advisories such as heavy rain advisories, gale advisories, and lightning advisories, although being less serious to the user than weather warnings, may be additionally included in the designated disaster prevention information. To sum it up, the designated disaster prevention information may include warnings and advisories on weather conditions such as wind, rain, snow, lightning, air temperature, and humidity and those on natural disasters that hit the ground such as earthquakes, tsunami, floods, and volcanic eruptions. The choice and designation of disaster prevention information as designated disaster prevention information may reflect the intention of the user. Specifically, the user can, via the electric power monitor 33 or the communication terminal 6, instruct the HEMS controller 30 (the operation control unit 21d and the disaster prevention information evaluation unit 21c) to rewrite the associated control information stored in the associated operation storage unit 24b.

An electrical appliance 3 and a primary and a secondary operation that the electrical appliance 3 will perform are associated with specific designated disaster prevention information. FIG. 3 only shows an example of the associated control information. The example in FIG. 3 does not limit which electrical appliance 3 is associated with what designated disaster prevention information and what primary and secondary operations.

The disaster-prevention-information-associated control operation assigned to the electrical appliance 3 is not necessarily a two-stage operation that involves a primary operation and a secondary operation. For example, a multi-stage operation, including at least a primary, a secondary, and a tertiary operation, may be assigned to an electrical appliance 3. As an example, if the electrical appliance 3 is the water heater 38, the primary operation may be to switch to a lower hot water temperature setting, the secondary operation may be to stop hot water supply, and the tertiary operation may be to fill the water heater 38 with hot water. As another example, if the electrical appliance 3 is the storage battery 40, the primary operation may be to reduce electric discharge, the secondary operation may be to suspend electric discharge, and the tertiary operation may be to charge the storage battery 40. In these examples, the electrical appliance 3 may first perform the primary operation in response to an issuance of an advisory, to "wait and see" so that the electrical appliance 3 does not perform the secondary and tertiary operations until the advisory is upgraded to a warning. As described here, the electrical appliance 3 may perform a tertiary and a quaternary operation or perform a lower-order operation of a multi-stage operation while another electrical appliance 3 may perform a higher-order operation of the multi-stage operation. These examples demonstrate that various combinations of electrical appliances 3 and operations are possible in accordance with changing disaster prevention information in the present invention.

The server 7 may have information or values that identifies/identify concrete settings in the associated control information, so that the server 7 can transfer the information or values to the disaster-prevention-information-associated control device 2 where the table shown in FIG. 3 is generated.

Associated Control of Storage Battery

If the electrical appliance 3 is the storage battery 40, the primary operation may be to suspend or prohibit electric discharge of the storage battery 40 to turn it into a standby state, and the secondary operation may be to fully charge the storage battery 40. These settings render the storage battery 40 ready for discharge for use in case of a power failure that may be caused by heavy rain, storm, or a lightning strike.

The storage battery 40 is turned into a standby state as the primary operation because the user may not want to charge the storage battery 40 immediately upon an announcement of designated disaster prevention information. For this reason, the storage battery 40 is turned into a standby state as the primary operation in order to give a time window for the user to check the necessity of carrying out the secondary operation or cancel the secondary operation. Electricity must to be bought from the power system grid 50 to charge the storage battery 40, which may possibly be regarded by the user as being an economic loss. It works for the benefit of the user to allow the secondary operation to be cancelled especially, for example, when there is a low level of danger in the user's geographical region at the time of the issuance of designated disaster prevention information. This description of the storage battery 40 also applies to the electric vehicle 41.

Associated Control of Water Heater

As described earlier, if the electrical appliance 3 is the water heater 38, the primary operation may be to prohibit the water heater 38 from dispensing hot water, and the secondary operation may be to fill the water heater 38 with hot water (allows the water heater 38 to boil up water therein). These settings render the water heater 38 ready for delivery of a sufficient amount of hot water in case of a power or water failure. The primary operation ay alternatively be to control the water heater 38 so as to lower the temperature setting for the hot water supplied by the water heater 38 (e.g., lower the hot water temperature setting from 45° C. to 40° C.), in which case the primary operation can decrease the usage of the hot water contained in the water heater 38. Note that, similarly to the case of the storage battery 40, the user may possibly think that the water heater 38 does not need to be filled with hot water by carrying out, the secondary operation and regard it as being an economic loss to perform such a secondary operation. For this reason, the water heater does not carry out the secondary operation immediately upon an issuance of designated disaster prevention information, but upon the issuance of designated disaster prevention information is turned into a temporary standby state where the water heater is prohibited from dispensing hot water, before performing the secondary operation. These settings give the user a time window to check the necessity of carrying out the secondary operation or cancel the secondary operation.

Associated Control of Air Conditioner

If the electrical appliance 3 is the air-conditioner indoor unit 35, the primary operation may be to control the air-conditioner indoor unit 35 to perform a cooling operation for a relatively low temperature (e.g., 25° C.), and the secondary operation may be to control the air-conditioner indoor unit 35 to change the temperature setting to a relatively high temperature (e.g., 28° C.) and perform a cooling operation to achieve that temperature. The secondary operation may also turn on an air-cleaning function of the air-conditioner indoor unit 35. These settings can provide comfortable air conditioning as a preparation for the user who cannot go outside and needs to spend time at home after the issuance of designated disaster prevention information because of poor weather conditions in the user's geographical region. In addition, since the secondary operation changes the temperature setting to a relatively high temperature and turns on the air-cleaning function, the air-conditioner unit 35 can operate in such a manner as to achieve both economic benefits and user comfort.

Some users may prefer to open a window and let in the outside air, depending on the situation of the user's geographical region. Some users may want to raise or lower the temperature setting in the secondary operation. Therefore, the interposing of the primary operation between the issuance of designated disaster prevention information and the secondary operation gives the user a time window to cancel the secondary operation or change settings for the secondary operation while the primary operation is being carried out.

Associated Control of Power Tap

In the present embodiment, the television 37 is connected to the power tap 36, which is an electrical appliance 3, as shown in FIG. 2. The power tap 36 operates in compliance with, for example, the ECHONET Lite communication standard to communicate with the HEMS controller 30 or the electric power monitor 33. The power tap 36 can turn on/off power supply to the television 37 on the basis of an instruction from the HEMS controller 30 or the electric power monitor 33. The instruction from the HEMS controller 30 or the electric power monitor 33 may be issued on the basis of a user instruction entered on the communication terminal 6. In other words, the power tap 36 performs a two-stage operation that involves turning on and off of the power supply.

For instance, the primary operation performed upon an issuance of a lightning advisory as designated disaster prevention information may be to control the power tap 36 to turn on the power supply in response to an instruction from the HEMS controller 30 or the electric power monitor 33. The primary operation turns on the power supply to the television 37 so that the user can check the ongoing situation on the television 37 upon the issuance of designated disaster prevention information. To avoid the risk of dielectric breakdown and malfunction of, for example, a power supply circuit of the television 37 due to a lightning surge in a lightning strike, the power tap 36 is controlled to perform a secondary operation a prescribed period of time (e.g., 3 minutes) after the power supply is turned on. As the secondary operation, the power tap 36 is controlled to turn off the power supply in response to an instruction from the HEMS controller 30 or the electric power monitor 33 upon elapsing of the prescribed period of time. The user is thus given a time window to cancel the secondary operation of the power tap 36 while the primary operation is being carried out.

Associated Control of Different Electrical Appliances

The description has so far focused on a single electrical appliance 3 performing both the primary operation and the secondary operation. The disaster-prevention-information-associated control in accordance with the present embodiment is, however, not limited to such cases: different electrical appliances 3 may perform the primary operation and the secondary operation.

For example, a user interface device (e.g., the communication terminal 6 or the electric power monitor 33) may be selected as the electrical appliance 3 that carries out the primary operation, and one of the electrical appliances described so far may be selected as the electrical appliance 3 that carries out the secondary operation. In addition, an electrical appliance to which no primary operation is assigned at all may be selected as the electrical appliance 3 that carries out the secondary operation, which is represented by a refrigerator in FIG. 3 as an example. For example, an energy saving mode operation is assigned to the refrigerator as the secondary operation with no operation being assigned thereto as the primary operation. Operating a refrigerator in energy saving mode reduces power consumption as a preparation, for example, for a situation where the storage battery 40 needs to discharge to supply electric power. In the other way round, a super cooling mode operation where the internal temperature of the refrigerator is lowered below the normal time temperature setting may be assigned to the refrigerator as the secondary operation, with no operation being assigned thereto as the primary operation, as a preparation for a situation where electric power supply for the refrigerator becomes unavailable.

If the electrical appliance 3 that performs the primary operation is a user interface device such as the communication terminal 6 or the electric power monitor 33, the electrical appliance 3 alerts the user to the start of disaster-prevention-information-associated control as the primary operation. For example, the user interface device alerts the user to an imminent start of disaster-prevention-information-associated control by means of a suitable combination of text, images, and sounds. In other words, an operation that alerts the user to the start of disaster-prevention-information-associated control is assigned as the primary operation to the user interface device.

In this example, the primary operation performed by the user interface device may replace the primary operations described as being performed by the air-conditioner indoor unit 35, the power tap 36, the water heater 38, and the storage battery 40 (electrical appliances 3). Alternatively or additionally, the primary operation performed by the user interface device may be combined with the secondary operation performed by the refrigerator. The user interface device performing the primary operation gives the user a time window to check the necessity for the electrical appliances 3 to carry out the secondary operations, cancel the individual secondary operations performed by the electrical appliances 3, and/or alter settings for the secondary operations.

Other examples are also possible. Namely, the electrical appliance 3 that performs the primary operation and the electrical appliance 3 that performs the secondary operation may be combined for any improved user comfort or safety in an emergency situation where designated disaster prevention information is announced. As a specific example, in response to an issuance of a storm warning or like designated disaster prevention information, the air-conditioner indoor unit may be controlled to perform a cooling operation with a temperature setting of 25° C. for comfortable air conditioning as the primary operation, and the power tap 36 connected to the television 37 may be controlled to turn on power supply as the secondary operation. These settings can prevent the closed indoor space from becoming hot and humid and enable the user to check the ongoing situation on the television 37 immediately upon the issuance of designated disaster prevention information.

Flow of Disaster-Prevention-Information-Associated Control

Figure 4:
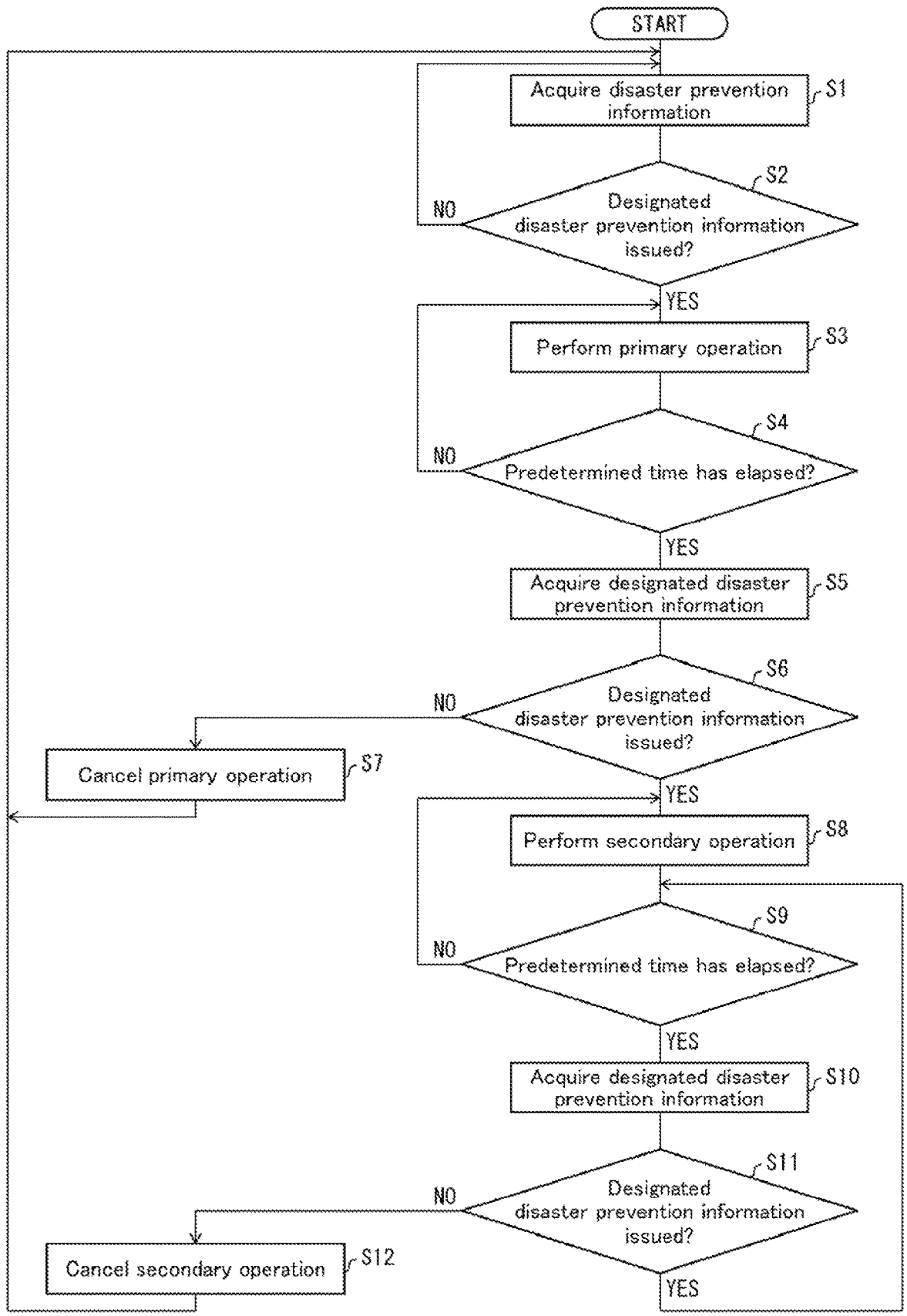
FIG. 4 is a flow chart representing a flow of a control method carried out by the disaster-prevention-information-associated control device included in the disaster-prevention-information-associated control system.

FIG. 4 is a flow chart representing a flow of disaster-prevention-information-associated control method carried out by the disaster-prevention-information-associated control device 2. Disaster-prevention-information-associated control is started upon power supply being turned on for the disaster-prevention-information-associated control device 2 or upon a user instruction being received via the communication terminal 6 or via the electric power monitor 33. As the disaster-prevention-information-associated control is started, the control unit 21 retrieves a disaster-prevention-information-associated control program from the control program storage unit 24c to start a control operation.

First, the disaster-prevention-information-associated control device 2 communicates with the server 7 to acquire disaster prevention information from the server 7 (step 1, hereinafter abbreviated "S1"). More specifically, the disaster prevention information acquisition unit 21b instructs the communication control unit 21a to communicate with the server 7 and acquire disaster prevention information from the server 7. The communication control unit 21a starts the timer 23 and accesses the server 7 via the communications unit 22 and over the network 5. The geographical region where there exists the disaster-prevention-information-associated control device 2 is usually identified when the disaster-prevention-information-associated control device 2 acquires disaster prevention information from the server 7. The geographical region is identified, for example, using a postcode that is fed by the user on the communication terminal 6 or the electric power monitor 33.

Next, the disaster-prevention-information-associated control device 2 determines whether or not the disaster prevention information acquired from the server 7 contains designated disaster prevention information, in other words, whether or not designated disaster prevention information has been issued (S2). As a more specific example, the disaster prevention information evaluation unit 21c determines whether or not the disaster prevention information received via the communication control unit 21a and the disaster prevention information acquisition unit 21b contains any of the designated disaster prevention information stored in the disaster prevention information storage unit 24a. Upon determining in S2 that no designated disaster prevention information has been issued, the disaster-prevention-information-associated control device 2 (disaster prevention information evaluation unit 21c) returns the process to S1 to re-access the server 7. Although not explicitly shown in the flow chart of FIG. 4, the disaster-prevention-information-associated control device 2 preferably re-accesses the server 7 every time a prescribed period of time is registered by the timer 23 (e.g., every 15 minutes).

On the other hand, upon determining in S2 that designated disaster prevention information has been issued, the disaster-prevention-information-associated control device 2 (disaster prevention information evaluation unit 21c) controls at least one electrical appliance 3 to which an associated control operation is assigned to perform the primary operation. As a more specific example, the disaster prevention information evaluation unit 21c identifies the electrical appliance 3 associated with the issued designated disaster prevention information and also identifies the primary operation assigned to the identified electrical appliance 3, by referring to the associated control information stored in the associated operation storage unit 24b. Thereafter, the disaster prevention information evaluation unit 21c instructs the operation control unit 21d to control the identified electrical appliance 3 to perform the identified primary operation. The operation control unit 21d, in response to the instruction from the disaster prevention information evaluation unit 21c, sends an instruction to control the identified electrical appliance 3 to perform the identified primary operation. This instruction is sent from the operation control unit 21d to the identified electrical appliance 3 via the communications unit 22 and over the local area network 4.

As the disaster-prevention-information-associated control device 2 (communication control unit 21a) is notified by the timer 23 after the primary operation is performed in S3 that a prescribed period of time (e.g., 15 minutes) has elapsed since the start of time measurement (YES in S4), the disaster-prevention-information-associated control device 2 (disaster prevention information acquisition unit 21b) re-acquires disaster prevention information from the server 7 (S5). The disaster-prevention-information-associated control device 2 (disaster prevention information evaluation unit 21c) also determines whether or not the designated disaster prevention information is still being issued (S6). S5 and S6 are identical to S1 and S2. If the prescribed period of time has not elapsed in S4, the electrical appliance 3 continues to perform the primary operation or continues to operate in primary operation mode.

Upon determining in S6 that the designated disaster prevention information is still being issued, the disaster-prevention-information-associated control device 2 (disaster prevention information evaluation unit 21c) controls either the electrical appliance 3 performing the primary operation or another electrical appliance 3 to perform a secondary operation (S8) assigned thereto. S8 is the same as S3, and its description is omitted.

On the other hand, upon determining in S6 that the designated disaster prevention information is no longer being issued, or in other words, that the issued designated disaster prevention information has been lifted, the disaster-prevention-information-associated control device 2 (disaster prevention information evaluation unit 21c) instructs the electrical appliance 3 to cancel the primary operation (S7). More specifically, if the disaster prevention information evaluation unit 21c determines that the re-acquired disaster prevention information no longer contains the previously issued designated disaster prevention information, the disaster prevention information evaluation unit 21c instructs the operation control unit 21d to cancel the primary operation being performed by the identified electrical appliance 3. The operation control unit 21d, in response to the instruction from the disaster prevention information evaluation unit 21c, sends an instruction to the identified electrical appliance 3 to cancel the primary operation. The issued designated disaster prevention information having been lifted indicates that the designated-disaster-prevention-information-associated control is no longer needed. Therefore, by proceeding from S7 back to S1, the designated-disaster-prevention-information-associated control is discontinued, and the whole process returns to the initial state.

Implementing S9 to S11 that are identical to S4 to S6 subsequently to S8 can cancel the secondary operation that is no longer needed if the issued designated disaster prevention information is lifted after the secondary operation is performed. The electrical appliance 3 that has been performing the secondary operation may resume normal operation or return to a normal state or to a state that the electrical appliance 3 was in before the designated disaster prevention information was issued. If the disaster-prevention-information-associated control device 2 (disaster prevention information evaluation unit 21c) determines in S11 that the designated disaster prevention information is still being issued, S9 to S11 are repeated. In other words, the secondary operation or the secondary operation mode continues until the issued designated disaster prevention information is lifted.

Steps equivalent to S8 to S12 may be repeatedly carried out in a tertiary or higher-order operation of a multi-stage operation immediately following a "YES" determination in S11. This process can similarly cancel the tertiary or higher-order operation of a multi-stage operation that is no longer needed if the issued designated disaster prevention information is lifted after the tertiary or higher-order operation is performed.

Embodiment 2

Figure 5:
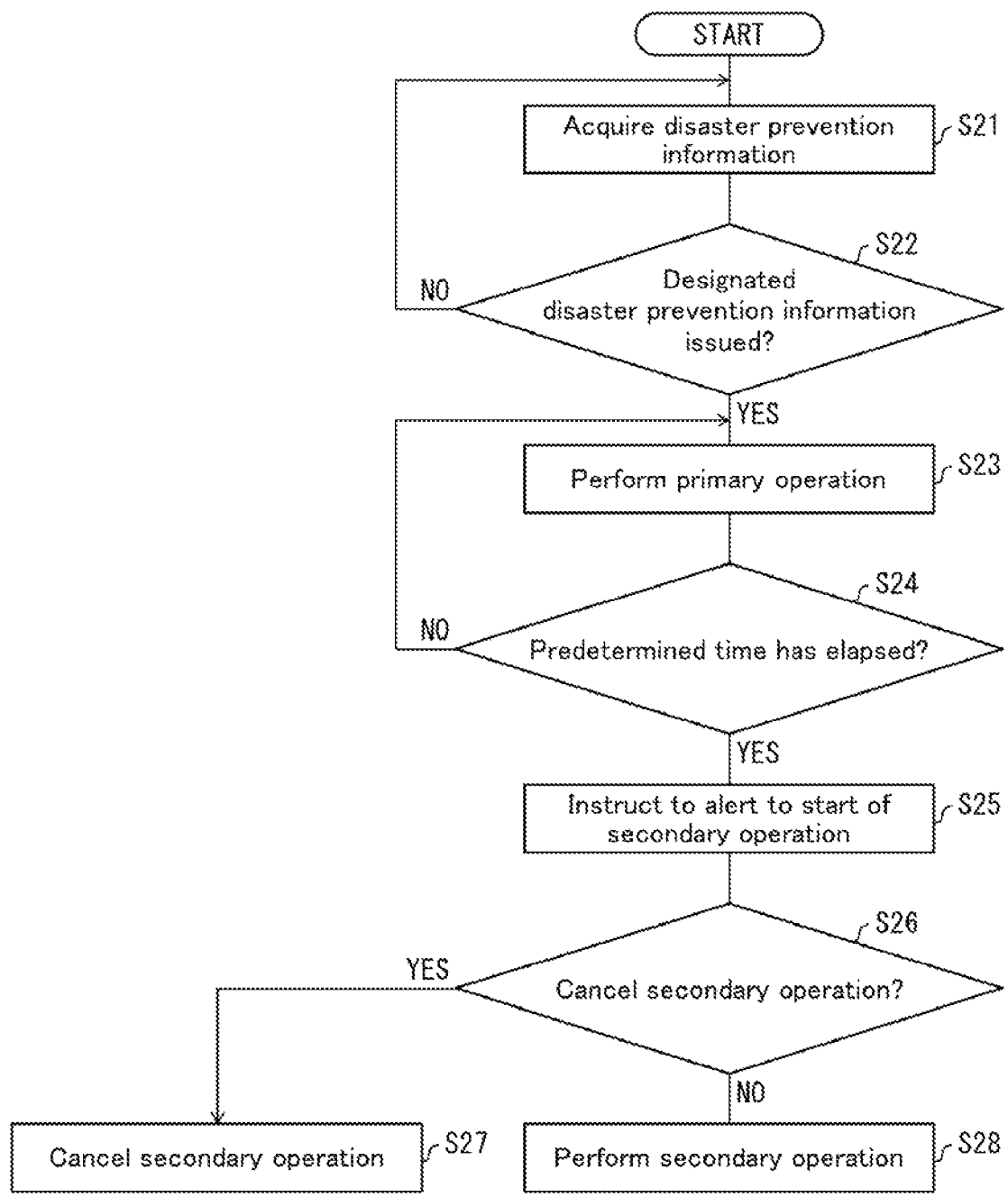
FIG. 5 is a flow chart representing a flow of a disaster-prevention-information-associated control method in accordance with Embodiment 2 of the present invention, the method including an example of an alert instruction operation carried out by the disaster-prevention-information-associated control device.

The following will describe another embodiment of the present invention in reference to FIG. 5. Embodiment 2 differs from Embodiment 1 only in the flow of the disaster-prevention-information-associated control carried out by the disaster-prevention-information-associated control device 2.

FIG. 5 is a flow chart representing a flow of a disaster-prevention-information-associated control method in accordance with Embodiment 2, the method including an example of an alert instruction operation carried out by the disaster-prevention-information-associated control device 2. S21 to S24 in FIG. 5 are the same as S1 to S4 in FIG. 4, and their description is omitted.

Subsequent to a specific electrical appliance 3 performing the primary operation in S23, upon being notified by the timer 23 that a prescribed period of time has elapsed since the start of time measurement (YES in S24), the disaster-prevention-information-associated control device 2 (operation control unit 21d) carries out S25. Specifically, the disaster-prevention-information-associated control device 2 (operation control unit 21d) instructs, for example, the communication terminal 6 or the electric power monitor 33 (hereinafter, the "user interface device") to alert the user that the specific electrical appliance 3 that has performed the primary operation or another electrical appliance 3 is going to perform the secondary operation.

Embodiment 1 implements such control that the primary operation or the secondary operation can be automatically cancelled if the designated disaster prevention information is lifted after the specific electrical appliance 3 performed the primary operation or the secondary operation. In contrast, Embodiment 2 allows the user to determine whether or not to cancel the secondary operation. For this purpose, the disaster-prevention-information-associated control device 2 (operation control unit 21d) determines in S26 whether or not an instruction to cancel the secondary operation has been entered on a user interface device.

Upon checking that an instruction to cancel the secondary operation has been entered on a user interface device (YES in S26), the disaster-prevention-information-associated control device 2 (operation control unit 21d) instructs the electrical appliance 3 that has performed or is performing the primary operation to cancel the secondary operation (S27). Accordingly, the electrical appliance 3 that has performed or is performing the primary operation does not perform the secondary operation and may continue to perform the primary operation or continue to operate in primary operation mode, resume normal operation, or return to a state that the electrical appliance 3 was in before the designated disaster prevention information was issued.

On the other hand, upon c at an instruction to permit the secondary operation has been entered on a user interface device (NO in S26), the disaster-prevention-information-associated control device 2 (operation control unit 21d) instructs the specific electrical appliance 3 that has performed the primary operation or another electrical appliance 3 to perform the secondary operation (S28). The disaster-prevention-information-associated control device 2 (operation control unit 21d) may alternatively perform S28 if no instruction to cancel the secondary operation is entered on the user interface device within a prescribed period of time. S28 is followed by S9 to S12 shown in FIG. 4.

In S25, the disaster-prevention-information-associated control device 2 (operation control unit 21d) may alternatively instruct the communication terminal 6 via the communications unit 22 and over the network 5 to alert the user that the specific electrical appliance 3 is going to perform the secondary operation. When this is the case, the user can give an instruction to permit or cancel the secondary operation to the disaster-prevention-information-associated control device 2 (operation control unit 21d) on the communication terminal 6.

These steps allow the user to, after the specific electrical appliance 3 performed the primary operation in response to an issuance of designated disaster prevention information, cancel the secondary operation at his/her discretion regardless of whether the designated disaster prevention information is still being issued or has been lifted. For example, the designated-disaster-prevention-information-associated control can be lifted if the user determines that no designated-disaster-prevention-information-associated control is needed in the user's locality although designated disaster prevention information is being issued. Embodiment 2 can hence prevent designated-disaster-prevention-information-associated control from being undesirably performed against the user's intention.

Embodiment 3

Figure 6:
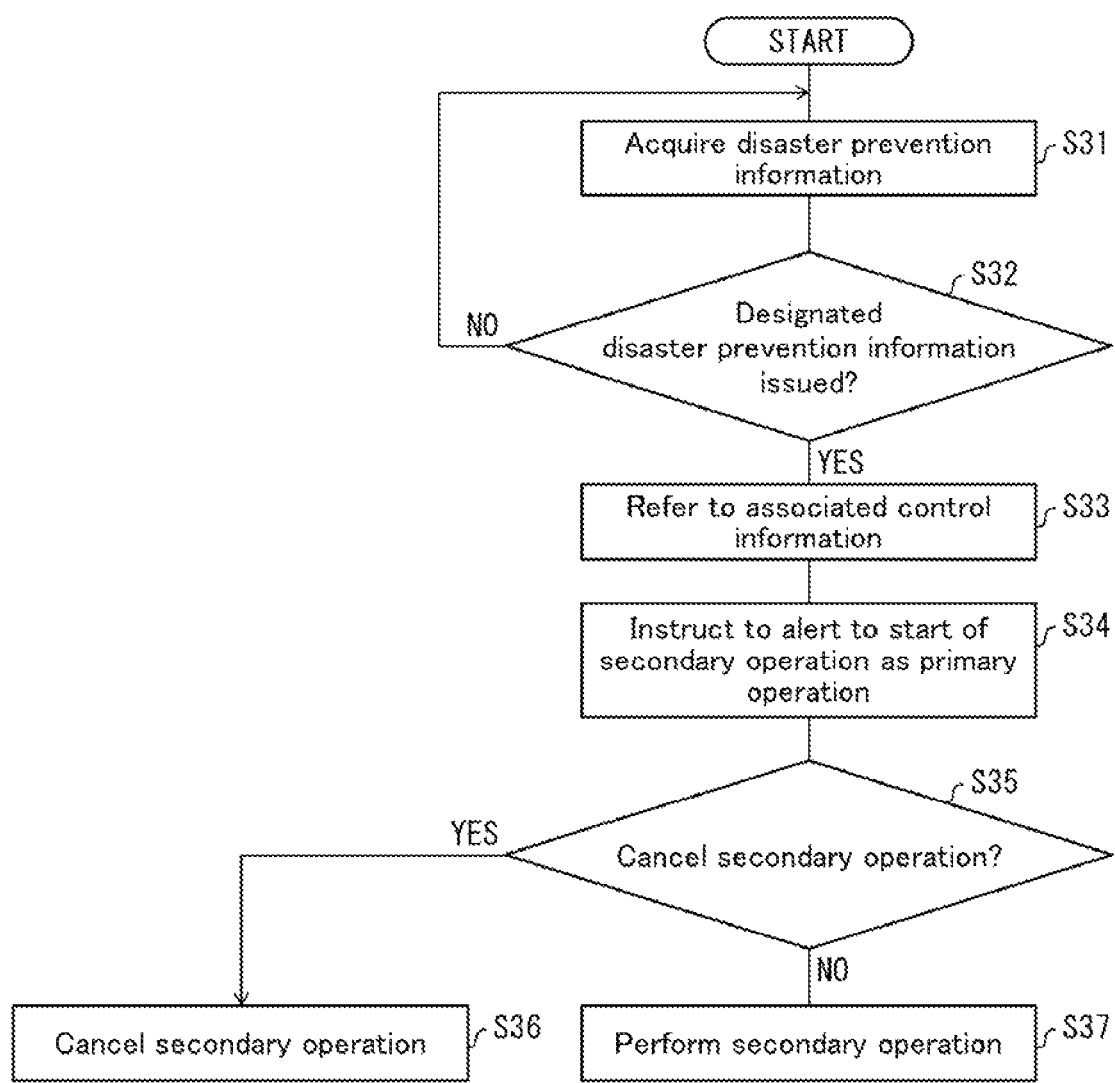
FIG. 6 is a flow chart representing a flow of a disaster-prevention-information-associated control method in accordance with Embodiment 3 of the present invention, the method including another example of an alert instruction operation carried out by the disaster-prevention-information-associated control device.

The following will describe another embodiment of the present invention in reference to FIG. 6. Embodiment 3 differs from Embodiments 1 and 2 only in the flow of the disaster-prevention-information-associated control carried out by the disaster-prevention-information-associated control device 2.

FIG. 6 is a flow chart representing a flow of a disaster-prevention-information-associated control method that includes another example of an alert instruction operation carried out by the disaster-prevention-information-associated control device 2. S31 and S32 in FIG. 6 are the same as S1 and S2 in FIG. 4, and their description is omitted.

In the disaster-prevention-information-associated control method in accordance with the present embodiment, the primary operation is performed by a user interface device (the communication terminal 6 or the electric power monitor 33) before the secondary operation is performed by a specific electrical appliance 3.

First, upon checking that designated disaster prevention information has been issued, the disaster-prevention-information-associated control device 2 (disaster prevention information evaluation unit 21*c*), in S32, identifies a user interface device as the electrical appliance that carries out the primary operation by referring to the associated control information stored in the associated operation storage unit 24*b*. The disaster-prevention-information-associated control device 2 (disaster prevention information evaluation unit 21*c*) also identifies the electrical appliance 3 that performs a secondary operation and the secondary operation performed by the electrical appliance 3 (S33). For example, upon checking that a storm warning has been issued, the disaster-prevention-information-associated control device 2 (disaster prevention information evaluation unit 21*c*) identifies all or some of the electrical appliances 3 (five types of electrical appliances ranging from a storage battery to a refrigerator) that are associated with a storm warning as shown in FIG. 3 and also identifies all the secondary operations assigned to these identified electrical appliances 3.

Next, the disaster-prevention-information-associated control device 2 (disaster prevention information evaluation unit 21*c*) instructs the identified user interface device to alert the user which electrical appliance 3 is about to perform which secondary, tertiary, or higher-order operation of a multi-stage operation in response to the issuance of the storm warning (S34). The user interface device performs an alert operation related to the secondary, tertiary, or higher-order operation in accordance with this instruction.

S35 to S37 in FIG. 6 are the same as S26 to S28 in FIG. 5, and their description is omitted. If a plurality of electrical appliances 3 is going to perform the secondary, tertiary, or higher-order operation of a multi-stage operation, the user may be alerted to such a situation in S34 and allowed to selectively cancel the secondary, tertiary, or higher-order operation performed by the electrical appliances 3 in S35.

These steps allow the user to evaluate the necessity of cancelling the secondary, tertiary or higher-order operation of a multi-stage operation in view of various developments of the situation after the issuance of designated disaster prevention information. If the user is allowed to selectively cancel the secondary, tertiary, or higher-order operation of a multi-stage operation performed by an electrical appliance 3, the user can selectively cancel the secondary, tertiary, or higher-order operation performed by the electrical appliance 3 in accordance with various developments of the situation.

Embodiment 4

Figure 7:
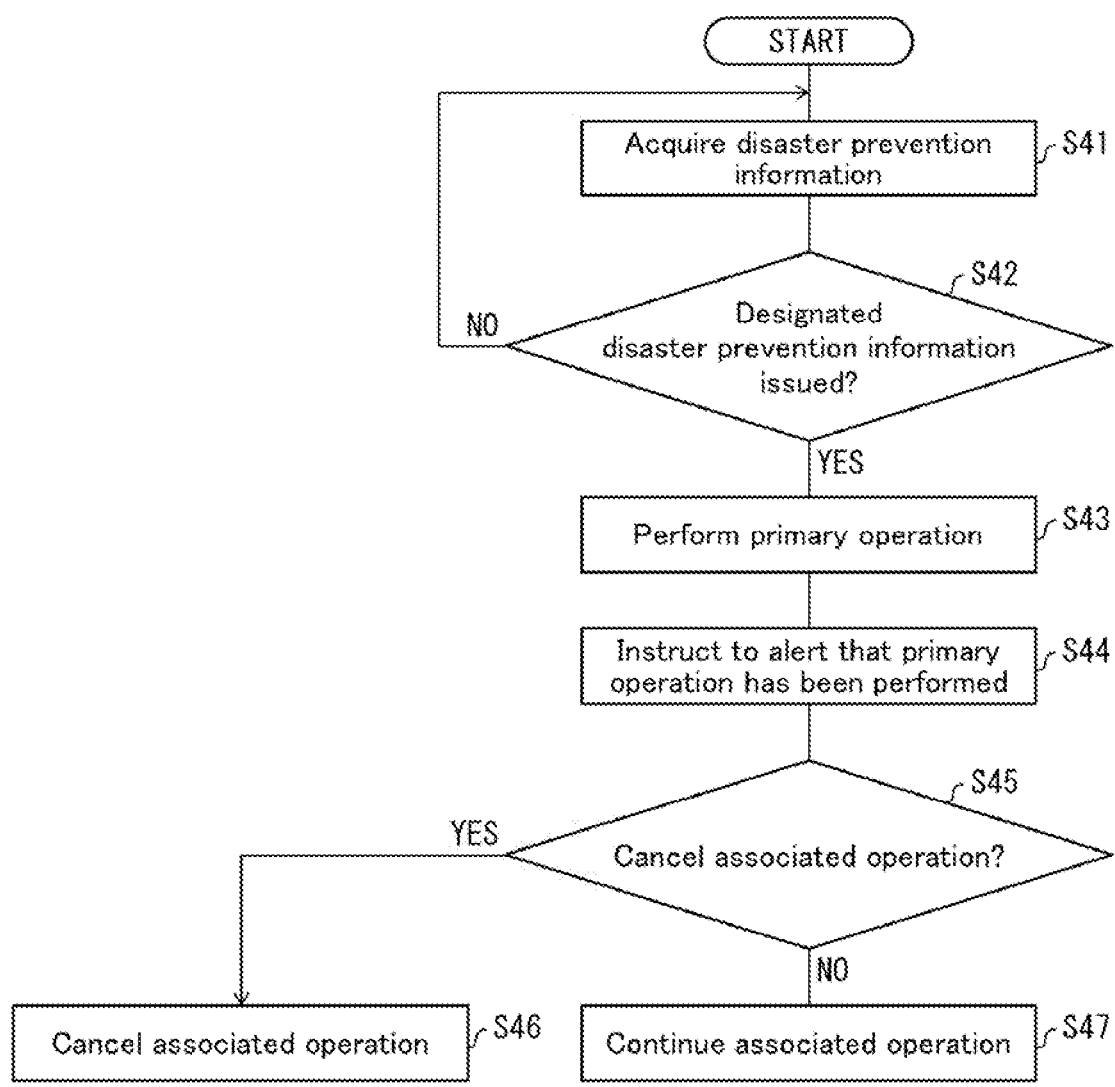
FIG. 7 is a flow chart representing a flow of a disaster-prevention-information-associated control method in accordance with Embodiment 4 of the present invention, the method including a further example of an alert instruction operation carried out by the disaster-prevention-information-associated control device.

The following will describe another embodiment of the present invention in reference to FIG. 7. Embodiment 4 differs from Embodiments 1 to 3 only in the flow of the disaster-prevention-information-associated control carried out by the disaster-prevention-information-associated control device 2.

FIG. 7 is a flow chart representing a flow of a disaster-prevention-information-associated control method that includes a further example of an alert instruction operation carried out by the disaster-prevention-information-associated control device 2. S41 to S43 in FIG. 7 are the same as S1 to S3 in FIG. 4, and their description is omitted.

The disaster-prevention-information-associated control method in accordance with the present embodiment performs the primary operation before alerting the user that the primary operation has been performed. The disaster-prevention-information-associated control method also allows the user to determine whether or not to cancel the disaster-prevention-information-associated control operation in view of the alert.

The disaster-prevention-information-associated control device 2 (operation control unit 21*d*), in S44, instructs a user interface device to alert the user that the specific electrical appliance 3 has performed a specific primary operation. Subsequently, in S45, the disaster-prevention-information-associated control device 2 (operation control unit 21*d*) determines whether or not an instruction to cancel the disaster-prevention-information-associated control operation has been entered on the user interface device.

The disaster-prevention-information-associated control device 2 (operation control unit 21*d*), upon checking that an instruction to cancel the disaster-prevention-information-associated control operation has been entered on the user interface device (YES in S45), instructs the electrical appliance 3 that has performed or is performing the primary operation to cancel the disaster-prevention-information-associated control operation (S46). In response to this instruction, the electrical appliance 3 that has performed or is performing the primary operation cancels the primary operation and either resumes normal operation or returns to a state that the electrical appliance 3 was in before the designated disaster prevention information was issued.

On the other hand, upon checking that an instruction to permit the disaster-prevention-information-associated control operation has been entered on the user interface device (NO in S45), the disaster-prevention-information-associated control device 2 (operation control unit 21*d*) allows the disaster-prevention-information-associated control operation to continue (S47). In other words, the disaster-prevention-information-associated control device 2 (operation control unit 21*d*) instructs the specific electrical appliance 3 that has performed the primary operation or another electrical appliance 3 to perform the secondary, tertiary, or higher-order operation of a multi-stage operation. The disaster-prevention-information-associated control device 2 (operation control unit 21*d*) may alternatively perform S47 if no instruction to cancel the disaster-prevention-information-associated control operation is entered on the user interface device within a prescribed period of time. S47 is followed by S4 to S12 shown in FIG. 4.

Embodiment 5

Figure 8:
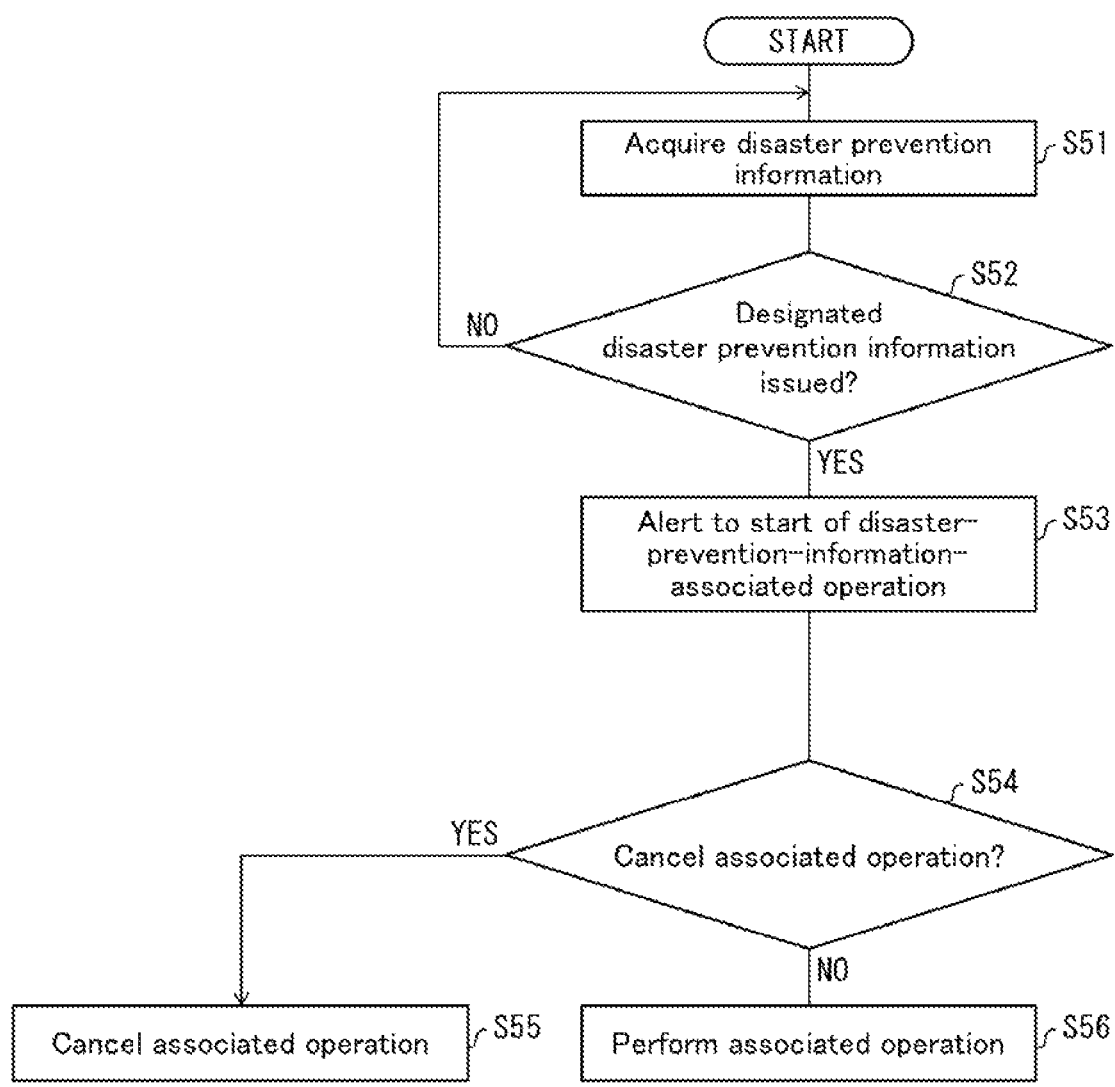
FIG. 8 is a flow chart representing a flow of a disaster-prevention-information-associated control method in accordance with Embodiment 5 of the present invention, the method including still another example of an alert instruction operation carried out by the disaster-prevention-information-associated control device
Figure 9:
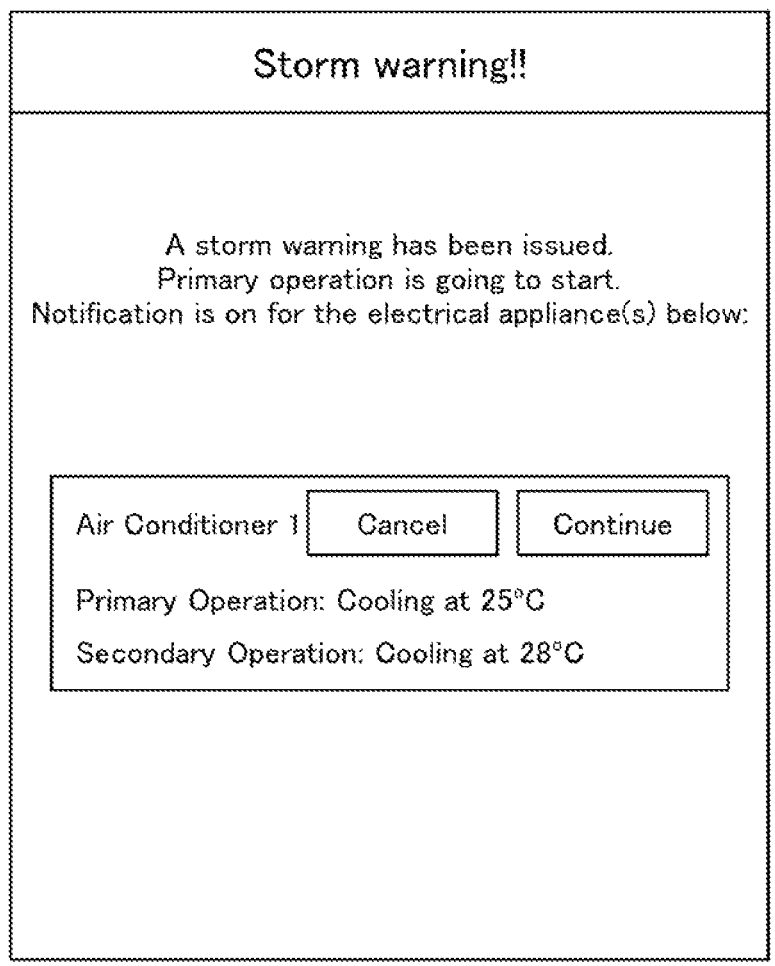
FIG. 9 is an illustration of an example screen displayed by the user interface device to alert the user to the start of a disaster-prevention-information-associated operation.

The following will describe another embodiment of the present invention in reference to FIGS. 8 and 9. Embodiment 5 differs from Embodiments 1 to 4 in the flow of the disaster-prevention-information-associated control carried out by the disaster-prevention-information-associated control device 2.

FIG. 8 is a flow chart representing a flow of a disaster-prevention-information-associated control method that includes still another example of an alert instruction operation carried out by the disaster-prevention-information-associated control device 2. S51 and S52 in FIG. 8 are the same as S1 and S2 in FIG. 4, and their description is omitted.

The disaster-prevention-information-associated control method in accordance with the present embodiment, upon checking that designated disaster prevention information has been issued, alerts the user that a disaster-prevention-information-associated control operation is about to start. The disaster-prevention-information-associated control method also allows the user to determine whether or not to cancel the disaster-prevention-information-associated control operation in view of the alert.

First, the disaster-prevention-information-associated control device 2 (disaster prevention information evaluation unit 21c), in S52, checks that designated disaster prevention information has been issued. Then, in S53, the disaster-prevention-information-associated control device 2 (disaster prevention information evaluation unit 21c) instructs a user interface device to alert the user to an imminent start of a disaster-prevention-information-associated control operation. The alert may or may not include specific information as to which electrical appliance 3 is about to perform which primary, secondary, tertiary, or higher-order operation of a multi-stage operation.

Subsequently, in S54, the disaster-prevention-information-associated control device 2 (disaster prevention information evaluation unit 21c) determines whether or not an instruction to cancel the disaster-prevention-information-associated control ration has been entered on the user interface device. Upon checking that an instruction to cancel the disaster-prevention-information-associated control operation has been entered on the user interface device (YES in S54), the disaster-prevention-information-associated control device 2 (disaster prevention information evaluation unit 21c) cancels the disaster-prevention-information-associated control operation, aborting the rest of the process (S55). Therefore, the electrical appliance 3 remains in the state that it was in before the designated disaster prevention information was issued.

On the other hand, upon checking that an instruction to permit the disaster-prevention-information-associated control operation has been entered on the user interface device (NO in S54), the disaster-prevention-information-associated control device 2 (disaster prevention information evaluation unit 21c) allows the disaster-prevention-information-associated control operation to continue (S56). In other words, S3 to S12 in FIG. 4 are carried out.

The disaster-prevention-information-associated control device 2 (disaster prevention information evaluation unit 21c), in S53, identifies the electrical appliance 3 and the primary, secondary, or tertiary, or higher-order operation of a multi-stage operation associated with the issued designated disaster prevention information by referring to associated control information. The user interface device may be instructed to alert the user to the identified specific information. FIG. 9 gives a specific example of a UI screen for such cases.

FIG. 9 is an illustration of an example screen displayed by the user interface device to alert the user to the start of a disaster-prevention-information-associated operation. The example screen in FIG. 9 shows a notification of an issued storm warning and which electrical appliance 3 is about to perform which primary and secondary operations in response to the issued storm warning. The notification may include a tertiary or higher-order operation of the multi-stage operation. Air conditioner 1 is being displayed as an electrical appliance 3 that is subjected to the disaster-prevention-information-associated control. Alternatively, all the electrical appliances 3 in FIG. 3 that are associated with a storm warning may be displayed. A "Cancel" instruction button and a "Continue" instruction button are also displayed for each electrical appliance 3 on display, so that the user can enter user instructions involved in S54 of the flow chart in FIG. 8 on the screen of the user interface device.

Embodiment 6

The following will describe another embodiment of the present invention in reference to FIG. 10. The present embodiment gives an example screen of a user interface device that allows the user to specify which electrical appliance 3 is to be subjected to disaster-prevention-information-associated control and which primary and secondary operations are to be performed by that electrical appliance 3. The present embodiment is applicable to Embodiments 1 to 5.

FIG. 10 is an illustration of an example input screen displayed by a user interface device (e.g., the communication terminal 6 or the electric power monitor 33) to allow the user to associate select electrical appliances with primary and secondary operations. The input screen shows an associated electrical appliance, a primary operation, and a secondary operation as setup items for each electrical appliance 3 and includes, for example, a scrollable or pop-up list of specific settings from which the user can select for each setup item. The input screen may include content related to a tertiary or higher-order operation of a multi-stage operation. This input screen is produced by the disaster-prevention-information-associated control device 2 (operation control unit 21d) retrieving data for a table shown in FIG. 3 from the disaster prevention information storage unit 24a to prepare display data and sending the display data to the user interface device. The format data for the UI screen may be in the form provided from the server 7 to the disaster-prevention-information-associated control device 2 (operation control unit 21d). All the electrical appliances 3 shown in FIGS. 2 and 3 that can communicate with the HEMS controller 30 are displayed as candidates for associated electrical appliances for selection. When an electrical appliance is selected as an associated electrical appliance, specific settings for the primary and secondary operations (and additional tertiary and higher-order operations) of a multi-stage operation are displayed in accordance with the associated electrical appliance for selection.

In the example input screen in FIG. 10, "Air conditioner 1" is selected as a first associated electrical appliance. Accordingly, windows for the primary operation are displayed for the user to select from operation modes such as "Cooling," "Heating," "Dehumidification," and "Ventilation" and from temperature options. "Cooling" and "25° C." are currently selected. Another window, "Notification on/off," is also displayed to enable a setting as to whether or not the user is to be alerted if the primary operation is about to start or has started. The same arrangement is possible for the secondary, tertiary, and higher-order operations of a multi-stage operation.

"Refrigerator" is selected as a second associated electrical appliance. Since the table in FIG. 3 includes no primary operation for a refrigerator, the window for the primary operation displays "Not applicable" as a default. Although no primary operation is available to a refrigerator, an alert operation by a user interface device may be selected as a primary operation. Therefore, the user can select "Notification on" in the "Notification on/off" window. The user can select a secondary operation, for example, from "Energy saving mode," "Super cooling operation mode," and "Quick ice making mode." "Energy saving mode" is currently selected.

The table in FIG. 3 shows seven types of electrical appliances 3 that can be subjected to disaster-prevention-information-associated control. Accordingly, the example input screen in FIG. 10 is arranged to allow the user to set up specific primary and secondary operations (and additional tertiary and higher-order operations) of a multi-stage operation for at least each of the seven types of electrical appliances 3.

Software Implementation

The control blocks in the control unit 21 of the disaster-prevention-information-associated control device 2 (particularly, the communication control unit 21a, the disaster prevention information acquisition unit 21b, the disaster prevention information evaluation unit 21c, and the operation control unit 21d) may be implemented by logic circuits (hardware) fabricated, for example, in the form of an integrated circuit (IC chip) and may be implemented by software executed by a CPU (central processing unit).

In the latter form of implementation, the disaster-prevention-information-associated control device 2 includes a CPU that executes instructions from programs or software by which various functions are implemented. The disaster-prevention-information-associated control device 2 also includes the memory 24 serving, for example, as a ROM (read-only memory) or like storage device (referred to as a "storage medium") containing the programs and various data in a computer-readable (or CPU-readable) format and/or a RAM (random access memory) into which the programs are loaded. The computer (or CPU) then retrieves and executes the programs contained in the storage medium, thereby achieving the object of the present invention. The storage medium may be a "non-transient, tangible medium" such as a tape, a disc, a card, a semiconductor memory, or programmable logic circuitry. The programs may be fed to the computer via any transmission medium (e.g., over a communications network or by broadcasting waves) that can transmit the programs. The present invention, in an aspect thereof, encompasses data signals on a carrier wave that are generated during electronic transmission of the programs.

General Description

The present invention, in aspect 1 thereof, is directed to disaster-prevention-information-associated control device (2): storing a primary operation of a two-stage operation assigned to a first electrical appliance (3a) and a secondary operation of the two-stage operation assigned to a second electrical appliance (3b) as a disaster-prevention-information-associated operation associated with disaster prevention information; giving the first electrical appliance an instruction as to the primary operation in response to a detection of an issuance of disaster prevention information in response to which the disaster-prevention-information-associated control device should perform disaster-prevention-information-associated control; and giving the second electrical appliance an instruction as to the secondary operation after a prescribed period of time has elapsed.

This arrangement divides into two stages the disaster-prevention-information-associated operation that the electrical appliances are controlled to perform in accordance with disaster prevention information. The arrangement can therefore interpose a primary operation between an issuance of disaster prevention information and a start of a secondary operation ("interposition of a primary operation") as an alternative to controlling the electrical appliances to perform an operation associated with the disaster prevention information immediately upon the issuance of the disaster prevention information. This interposition of a primary operation gives a user of the electrical appliances a time window before the secondary operation is started, so that the user can, for example, prepare for a start of the secondary operation and/or check the necessity of controlling the electrical appliances to perform the secondary operation.

As a result, the disaster-prevention-information-associated operation is carried out in at least two stages in response to an issuance of disaster prevention information, which can reduce the possibility of an undesirable situation happening to the user. The disaster-prevention-information-associated operation that the electrical appliances are controlled to perform in accordance with disaster prevention information is not necessarily divided into two stages and may be divided into three or more stages. The division of the disaster-prevention-information-associated operation into a plurality of stages can further improve user comfort or safety in an emergency situation where designated disaster prevention information is announced. When the disaster-prevention-information-associated operation is divided into three or more stages, each of these further divided stages of the operation may be assigned to either one or both of the first electrical appliance and the second electrical appliance or even to another electrical appliance. The disaster-prevention-information-associated operation may also be divided into a plurality of stages in accordance with changing disaster prevention information (an increasing level of danger) such as an upgrade from a gale advisory to a storm warning or an issuance of a lightning advisory on top of an existing storm warning. Either one or both of the first electrical appliance and the second electrical appliance may then be controlled to perform, for example, a tertiary operation and a quaternary operation.

The disaster-prevention-information-associated control device may instruct different electrical appliances or the same electrical appliance to perform the primary operation and the secondary operation. A reference time for the prescribed period of time may be any time including the time when disaster prevention information is issued, the time when a controller detects disaster prevention information, or the time when a controller gives an instruction as to the primary operation. The prescribed period of time may be of any length.

In aspect 2 of the present invention, the disaster-prevention-information-associated control device (2) of aspect 1 is configured such that the first electrical appliance (3a) and the second electrical appliance (3b) are different electrical appliances.

This arrangement enables different electrical appliances to perform the primary operation and the secondary operation. That in turn enables, for example, each operation to be performed by an electrical appliance that is suitable for the operation.

In aspect 3 of the present invention, the disaster-prevention-information-associated control device of aspect 1 or 2 may be configured so as to: further detect, after giving the instruction as to the primary operation, whether or not the disaster prevention information is still being issued; and give the instruction as to the secondary operation upon detecting that the disaster prevention information is still being issued.

According to this arrangement, that either the first electrical appliance or the second electrical appliance (hereinafter, simply the "electrical appliance") performs a disaster-prevention-information-associated operation matters only when disaster prevention information was issued and is still being issued. Therefore, the disaster-prevention-information-associated control device preferably detects whether or not disaster prevention information is still being issued before instructing the electrical appliance to perform the secondary operation. If the disaster prevention information has been lifted, the disaster-prevention-information-associated control device may control the electrical appliance to perform normal operation or to return to a state that the electrical appliance was in before the disaster prevention information was issued, instead of to perform the secondary operation associated with the disaster prevention information. Hence, the electrical appliance performs the secondary operation when the electrical appliance needs to perform the secondary operation.

In aspect 4 of the present invention, the disaster-prevention-information-associated control device of any one of aspects 1 to 3 may be configured so as to further: detect, after giving the instruction as to the primary operation, whether or not the disaster prevention information is still being issued; and give an instruction to cancel the primary operation upon detecting that the disaster prevention information has been lifted, thereby causing a suspension of the disaster-prevention-information-associated operation.

According to this arrangement, if the disaster-prevention-information-associated control device instructed the electrical appliances to perform the primary operation, but has detected that the disaster prevention information is lifted, it indicates that the disaster-prevention-information-associated control device no longer needs to control the electrical appliances to perform the disaster-prevention-information-associated operation. Therefore, the disaster-prevention-information-associated control device may cancel the operation being performed by the electrical appliances as the primary operation or cancel the state in which the electrical appliances are operating continuously in primary operation mode, thereby causing the electrical appliances to resume normal operation or to return to a state that the electrical appliances were in before the disaster prevention information was issued. The electrical appliances can be hence prevented from performing the primary operation or continuing the ongoing primary operation in spite of there being no longer a need for the electrical appliances to perform the disaster-prevention-information-associated operation. In other words, the disaster-prevention-information-associated control device may control the electrical appliance to perform the primary operation or to continue the already ongoing primary operation, when there is a need for an electrical appliance to perform a disaster-prevention-information-associated operation.

In aspect 5 of the present invention, the disaster-prevention-information-associated control device of any one of aspects 1 to 4 may be configured so as to further: detect, after giving the instruction as to the secondary operation, whether or not the disaster prevention information is still being issued; and give an instruction to cancel the secondary operation upon detecting that the disaster prevention information has been lifted.

According to this arrangement, the electrical appliances can be prevented from performing the secondary operation or continuing the ongoing secondary operation in spite of there being no longer a need for the electrical appliances to perform the disaster-prevention-information-associated operation as described above. In other words, the disaster-prevention-information-associated control device may control the electrical appliance to perform the secondary operation or to continue the already ongoing secondary operation, when there is a need for an electrical appliance to perform a disaster-prevention-information-associated operation.

In aspect 6 of the present invention, the disaster-prevention-information-associated control device of any one of aspects 1 to 5 may be configured to be capable of communicating with a user interface device (the communication terminal 6 or the electric power monitor 33), the disaster-prevention-information-associated control device further instructing the user interface device to alert a user that the disaster-prevention-information-associated control, the primary operation, or the secondary operation is about to start.

According to this arrangement, the user can know, from the alert made by the user interface device, what operation the electrical appliances are about to start upon an issuance of disaster prevention information in response to which the disaster-prevention-information-associated control device should perform disaster-prevention-information-associated control.

In aspect 7 of the present invention, the disaster-prevention-information-associated control device of aspect 6 may be configured so as to further accept cancellation of the disaster-prevention-information-associated control, the primary operation, or the secondary operation upon receiving an instruction for the cancellation from the user interface device (the communication terminal 6 or the electric power monitor 33).

According to this arrangement, the user can determine whether or not to have the electrical appliances perform the disaster-prevention-information-associated control, the primary operation, and the secondary operation. The user can hence determine the need to perform the disaster-prevention-information-associated control, the primary operation, and the secondary operation based on the user's decision and in accordance with the situation around the user.

The present invention, in aspect 8 thereof, is directed to a disaster-prevention-information-associated control system (1) including: the disaster-prevention-information-associated control device (2) of any one of aspects 1 to 7; at least one electrical appliance (3) capable of communicating with the disaster-prevention-information-associated control device (2) and subjected to the disaster-prevention-information-associated control; a server (7) capable of communicating with the disaster-prevention-information-associated control device (2) and configured to manage at least the disaster prevention information and information to which the user is alerted in relation to the disaster-prevention-information-associated control; and a user interface device (the communication terminal 6) capable of communicating with the disaster-prevention-information-associated control device (2) and with the server (7) and configured to alert the user to at least the information received from the server (7) and information related to the disaster-prevention-information-associated control and to give a user instruction to the disaster-prevention-information-associated control device (2) either directly or via the server (7).

This arrangement can construct a system in which the user enters on the user interface device an instruction that is given to the disaster-prevention-information-associated control device of any one of aspects 1 to 7 either directly or via a server to have the electrical appliances perform a disaster-prevention-information-associated operation as described above.

The present invention, in aspect 9 thereof, is directed to a disaster-prevention-information-associated control method performed by disaster-prevention-information-associated control device (2), the method including: assigning a first electrical appliance (3a) a primary operation of a two-stage operation and a second electrical appliance (3b) a secondary operation of the two-stage operation as a disaster-prevention-information-associated operation associated with disaster prevention information; giving the first electrical appliance (3a) an instruction as to the primary operation in response to a detection of an issuance of disaster prevention information in response to which the disaster-prevention-information-associated control device (2) should perform disaster-prevention-information-associated control; and giving the second electrical appliance (3b) an instruction as to the secondary operation after a prescribed period of time has elapsed.

This method can achieve the same advantages as the disaster-prevention-information-associated control device of aspect 1.

In aspect 10 of the present invention, the disaster-prevention-information-associated control method of aspect 9 is configured such that the first electrical appliance (3a) and the second electrical appliance (3b) are different electrical appliances.

This method can achieve the same advantages as the disaster-prevention-information-associated control device of aspect 2.

The present invention, in an aspect thereof, is directed to a disaster-prevention-information-associated control device (2) capable of communicating with a plurality of electrical appliances (3). The disaster-prevention-information-associated control device (2) at least assigns a first electrical appliance (3a), which is one of the electrical appliances (3), a primary operation of an at least two-stage operation and a second electrical appliance (3b), which is another one of the electrical appliances (3), a secondary operation of the at least two-stage operation as a disaster-prevention-information-associated operation associated with disaster prevention information. The first electrical appliance (3a) and the second electrical appliance (3b) are different electrical appliances. The disaster-prevention-information-associated control device (2) gives an instruction as to the primary operation to the first electrical appliance (3a) in response to a detection of an issuance of disaster prevention information in response to which the disaster-prevention-information-associated control device (2) should perform disaster-prevention-information-associated control and gives an instruction as to the secondary operation to the second electrical appliance (3b) after a prescribed period of tune has elapsed.

This arrangement divides into at least two stages the disaster-prevention-information-associated operation that the electrical appliances are controlled to perform in accordance with disaster prevention information. The arrangement can therefore interpose a primary operation between an issuance of disaster prevention information and a start of a secondary operation ("interposition of a primary operation") as an alternative to controlling the electrical appliances to perform an operation associated with the disaster prevention information immediately upon the issuance of the disaster prevention information. This interposition of a primary operation gives a user of the electrical appliances a time window before the secondary operation is started, so that the user can, for example, prepare for a start of the secondary operation and/or check the necessity of controlling the electrical appliances to perform the secondary operation.

As a result, the disaster-prevention-information-associated operation is carried out in at least two stages in response to an issuance of disaster prevention information, which can reduce the possibility of an undesirable situation happening to the user. The disaster-prevention-information-associated operation may be further divided into three or more stages, so that each of these stages can be assigned to either one or both of the first electrical appliance and the second electrical appliance. Either one or both of the first electrical appliance and the second electrical appliance may be controlled to perform, for example, a tertiary operation and a quaternary operation in accordance with changing disaster prevention information (an increasing level of danger) such as an upgrade from a gale advisory to a storm warning or an issuance of a lightning advisory on top of an existing storm warning.

The disaster-prevention-information-associated control device may instruct different electrical appliances or the same electrical appliance to perform the primary operation and the secondary operation. A reference time for the prescribed period of time may be any time including the time when disaster prevention information is issued, the time when a controller detects disaster prevention information, or the time when a controller gives an instruction as to the primary operation. The prescribed period of time may be of any length.

The present invention, in an aspect thereof, is directed to a disaster-prevention-information-associated control device (2) capable of communicating with at least one electrical appliance (3). The disaster-prevention-information-associated control device (2) at least assigns a first electrical appliance (3a), which is an electrical appliance (3), a primary operation and a secondary operation of an at least two-stage operation as a disaster-prevention-information-associated operation associated with disaster prevention information. The disaster-prevention-information-associated control device (2) gives an instruction as to the primary operation the first electrical appliance (3a) in response to a detection of an issuance of disaster prevention information in response to which the disaster-prevention-information-associated control device (2) should perform disaster-prevention-information-associated control and gives an instruction as to the secondary operation to the first appliance (3a) after a prescribed period of time has elapsed.

This arrangement can achieve the same advantages as the disaster-prevention-information-associated control device of aspect 1. In addition, since the same electrical appliance performs the primary operation and the secondary operation, the electrical appliance can switch between its operation modes for any increase in the benefits enjoyed by the user in an emergency situation. These multi-stage operation modes each involving at least two stages of operation may be set up in view of better disaster prevention, improved user safety in an emergency situation, or eased discomfort in the user's life in an emergency situation.

The present invention, in an aspect thereof, is directed to a disaster-prevention-information-associated control method performed by a disaster-prevention-information-associated control device (2) capable of communicating with a plurality of electrical appliances (3). The method assigns a first electrical appliance (3a), which is one of the electrical appliances (3), a primary operation of an at least two-stage operation and a second electrical appliance (3b), which is another one of the electrical appliances (3), a secondary operation of the at least two-stage operation as a disasterprevention-information-associated operation associated with disaster prevention information. The first electrical appliance (3a) and the second electrical appliance (3b) are different electrical appliances. The disaster-prevention-information-associated control device (2) gives an instruction as to the primary operation to the first electrical appliance (3a) in response to a detection of an issuance of disaster prevention information in response to which the disaster-prevention-information-associated control device (2) should perform disaster-prevention-information-associated control and gives an instruction as to the secondary operation to the second electrical appliance (3b) after a prescribed period of time has elapsed.

This method can achieve the same advantages as the disaster-prevention-information-associated control device of aspect 2.

The present invention, in an aspect thereof, is directed to a disaster-prevention-information-associated control method performed by disaster-prevention-information-associated control device (2) capable of communicating with at least one electrical appliance (3). The method at least assigns a first electrical appliance (3a), which is one of the electrical appliances (3), a primary operation and a secondary operation of an at least two-stage operation as a disaster-prevention-information-associated operation associated with disaster prevention information. The method gives an instruction as to the primary operation to the first electrical appliance (3a) in response to a detection of an issuance of disaster prevention information in response to which the disaster-prevention-information-associated control device (2) should perform disaster-prevention-information-associated control and gives an instruction as to the secondary operation to the first electrical appliance (3a) after a prescribed period of time has elapsed.

This method can achieve the same advantages as the disaster-prevention-information-associated control device of aspect 1.

The disaster-prevention-information-associated control device of any aspect of the present invention may be implemented on a computer, in which case the present invention encompasses a disaster-prevention-information-associated control program that causes a computer to function as the various units (software elements) of the disaster-prevention-information-associated control device, thereby implementing the disaster-prevention-information-associated control device on the computer, and also encompasses a computer-readable storage medium containing the disaster-prevention-information-associated control program.

The present invention is not limited to the description of the embodiments above and may be altered within the scope of the claims. Embodiments based on a proper combination of technical means disclosed in different embodiments are encompassed in the technical scope of the present invention. Furthermore, a new technological feature may be created by combining different technological means disclosed in the embodiments.

REFERENCE SIGNS LIST

1 Disaster-prevention-information-associated control system
2 Disaster-prevention-information-associated control device
3 Electrical appliance
3a First electrical appliance
3b Second electrical appliance
6 Communication terminal (user interface device)
7 Server
21 Control unit
30 HEMS controller (disaster-prevention-information-associated control device)
33 Electric power monitor (user interface device)

The invention claimed is:

1. A disaster-prevention-information-associated control device comprising:
a memory that stores instructions; and
a processor that executes the instructions stored in the memory to:
store a primary operation of a two-stage operation assigned to a first electrical appliance and a secondary operation of the two-stage operation assigned to a second electrical appliance as a disaster-prevention-information-associated operation associated with disaster prevention information;
give the first electrical appliance an instruction as to the primary operation in response to a detection of an issuance of disaster prevention information in response to which the disaster-prevention-information-associated control device should perform disaster-prevention-information-associated control; and
after a prescribed period of time has elapsed, upon detecting that the disaster prevention information is still being issued or detecting another disaster prevention information different from the disaster prevention information, give the second electrical appliance an instruction as to the secondary operation,
wherein the disaster prevention information in response to which the disaster-prevention-information-associated control device should perform disaster-prevention-information-associated control is disaster prevention information regarding weather.

2. The disaster-prevention-information-associated control device according to claim 1, wherein the first electrical appliance and the second electrical appliance are different electrical appliances.

3. The disaster-prevention-information-associated control device according to claim 2, wherein
the second electrical appliance is a refrigerator, and
the secondary operation is an energy saving mode operation or a super cooling mode.

4. The disaster-prevention-information-associated control device according to claim 1, the processor further executes the instructions to:
after detecting whether or not the disaster prevention information is still being issued, give an instruction to cancel the primary operation upon detecting that the disaster prevention information has been lifted, thereby causing a suspension of the disaster-prevention-information-associated operation.

5. The disaster-prevention-information-associated control device according to claim 1, the processor further executes the instructions to:
after detecting whether or not the disaster prevention information is still being issued, give an instruction to cancel the secondary operation upon detecting that the disaster prevention information has been lifted.

6. The disaster-prevention-information-associated control device according to claim 1, the disaster-prevention-information-associated control device being capable of communicating with a user interface device, the processor further instructing the user interface device to alert a user that the disaster-prevention-information-associated control, the primary operation, or the secondary operation is about to start.

7. The disaster-prevention-information-associated control device according to claim 6, further accepting cancellation of the disaster-prevention-information-associated control, the primary operation, or the secondary operation upon receiving an instruction for the cancellation from the user interface device.

8. The disaster-prevention-information-associated control device according to claim 1, wherein:
the first electrical appliance and the second electrical appliance are an identical water heater,
the primary operation is prohibition of supply of hot water or lowering temperature setting for hot water, and
the secondary operation is boiling up water.

9. The disaster-prevention-information-associated control device according to claim 1, wherein:
the second electrical appliance is a water heater, and
the secondary operation is boiling up water.

10. The disaster-prevention-information-associated control device according to claim 1, wherein:
the processor further executes the instructions to store the primary operation of a three-stage operation assigned to the first electrical appliance, the secondary operation of the three-stage operation assigned to the second electrical appliance, and a tertiary operation of the three-stage operation assigned to a third electrical appliance, as the disaster-prevention-information-associated operation associated with the disaster prevention information;
after giving the second electrical appliance the instruction as to the secondary operation, and upon detecting that the disaster prevention information is still being issued or detecting another disaster prevention information different from the disaster prevention information, give the third electrical appliance an instruction as to the tertiary operation,
the first electrical appliance, the second electrical appliance, and the third electrical appliance are an identical water heater,
the primary operation is lowering temperature setting for hot water,
the secondary operation is prohibition of supply of hot water, and
the tertiary operation is boiling up water.

11. The disaster-prevention-information-associated control device according to claim 1, wherein:
the processor further executes the instructions to store the primary operation of a three-stage operation assigned to the first electrical appliance, the secondary operation of the three-stage operation assigned to the second electrical appliance, and a tertiary operation of the three-stage operation assigned to a third electrical appliance, as the disaster-prevention-information-associated operation associated with the disaster prevention information;
after giving the second electrical appliance the instruction as to the secondary operation, and upon detecting that the disaster prevention information is still being issued or detecting another disaster prevention information different from the disaster prevention information, give the third electrical appliance an instruction as to the tertiary operation,
the first electrical appliance, the second electrical appliance, and the third electrical appliance are an identical storage battery,
the primary operation is reducing electric discharge of the storage battery,
the secondary operation is suspending electric discharge of the storage battery, and
the tertiary operation is charging the storage battery.

12. The disaster-prevention-information-associated control device according to claim 1, wherein
the first electrical appliance and the second electrical appliance are an identical storage battery,
the primary operation is suspending or prohibiting electric discharge of the storage battery to turn the storage battery into a standby state, and
the secondary operation is charging the storage battery.

13. The disaster-prevention-information-associated control device according to claim 1, wherein
the second electrical appliance is a storage battery, and
the secondary operation is charging the storage battery.

14. The disaster-prevention-information-associated control device according to claim 1, wherein the primary operation and the secondary operation the electric appliance performs are associated with the disaster prevention information in response to which the disaster-prevention-information-associated control device should perform disaster-prevention-information-associated control.

15. The disaster-prevention-information-associated control device according to claim 14, wherein
the primary operation is reducing power consumption of the electric appliance, and
the secondary operation is storing energy in the electric appliance.

16. The disaster-prevention-information-associated control device according to claim 14, wherein
the secondary operation is reducing power consumption of the electric appliance except for turning off the power of the electric appliance.

17. A disaster-prevention-information-associated control system comprising:
the disaster-prevention-information-associated control device according to claim 1;
at least one electrical appliance capable of communicating with the disaster-prevention-information-associated control device and subjected to the disaster-prevention-information-associated control;
a server capable of communicating with the disaster-prevention-information-associated control device and configured to manage at least the disaster prevention information and information to which the user is alerted in relation to the disaster-prevention-information-associated control; and
a user interface device capable of communicating with the disaster-prevention-information-associated control device and with the server and configured to alert the user to at least the information received from the server and information related to the disaster-prevention-information-associated control and to give a user instruction to the disaster-prevention-information-associated control device either directly or via the server.

18. A disaster-prevention-information-associated control method performed by a disaster-prevention-information-associated control device, the disaster-prevention-information-associated control device comprising:
a memory that stores instructions; and
a processor that executes the instructions stored in the memory to perform disaster-prevention-information-associated control, and
the method comprising:
assigning a first electrical appliance a primary operation of a two-stage operation and a second electrical appliance a secondary operation of the two-stage operation as a disaster-prevention-information-associated operation associated with disaster prevention information;
upon detecting an issuance of disaster prevention information by the disaster-prevention-information-associated control device, giving the first electrical appliance an instruction as to the primary operation; and
after a prescribed period of time has elapsed, upon detecting that the disaster prevention information is still being issued or detecting another disaster prevention information different from the disaster prevention information, giving the second electrical appliance an instruction as to the secondary operation,
wherein the disaster prevention information is regarding weather.

19. The disaster-prevention-information-associated control method according to claim 18, wherein the first electrical appliance and the second electrical appliance are different electrical appliances.

20. A disaster-prevention-information-associated control device comprising:
a memory that stores instructions; and
a processor that executes the instructions stored in the memory to:
store a primary operation of a two-stage operation assigned to a first electrical appliance and a secondary operation of the two-stage operation assigned to a second electrical appliance as a disaster-prevention-information-associated operation associated with disaster prevention information;
give the first electrical appliance an instruction as to the primary operation in response to a detection of an issuance of disaster prevention information in response to which the disaster-prevention-information-associated control device should perform disaster-prevention-information-associated control; and
after a prescribed period of time has elapsed, upon detecting that the disaster prevention information is still being issued or detecting another disaster prevention information different from the disaster prevention information, give the second electrical appliance an instruction as to the secondary operation; and
after detecting whether or not the disaster prevention information is still being issued, give an instruction to cancel the primary operation upon detecting that the disaster prevention information has been lifted, thereby causing a suspension of the disaster-prevention-information-associated operation.

21. A disaster-prevention-information-associated control device comprising:
a memory that stores instructions; and
a processor that executes the instructions stored in the memory to:
store a primary operation of a two-stage operation assigned to a first electrical appliance and a secondary operation of the two-stage operation assigned to a second electrical appliance as a disaster-prevention-information-associated operation associated with disaster prevention information;
give the first electrical appliance an instruction as to the primary operation in response to a detection of an issuance of disaster prevention information in response to which the disaster-prevention-information-associated control device should perform disaster-prevention-information-associated control; and
after a prescribed period of time has elapsed, upon detecting that the disaster prevention information is still being issued or detecting another disaster prevention information different from the disaster prevention information, give the second electrical appliance an instruction as to the secondary operation, wherein
the second electrical appliance is a storage battery, and the secondary operation is charging the storage battery.

\* \* \* \* \*